(12) United States Patent
Kershner et al.

(10) Patent No.: US 11,397,844 B2
(45) Date of Patent: Jul. 26, 2022

(54) COMPUTER BASED UNITARY WORKSPACE LEVERAGING MULTIPLE FILE-TYPE TOGGLING FOR DYNAMIC CONTENT CREATION

(71) Applicant: Kahana Group Inc., Chicago, IL (US)

(72) Inventors: Adam Kershner, Durham, NC (US); Jonathan Gans, New York, NY (US)

(73) Assignee: Kahana Group Inc., Chicago, IL (US)

( * ) Notice: Subject to any disclaimer, the term of this patent is extended or adjusted under 35 U.S.C. 154(b) by 17 days.

(21) Appl. No.: 16/705,457

(22) Filed: Dec. 6, 2019

(65) Prior Publication Data

US 2021/0110102 A1   Apr. 15, 2021

Related U.S. Application Data

(60) Provisional application No. 62/913,842, filed on Oct. 11, 2019.

(51) Int. Cl.
*G06F 40/166* (2020.01)
*G06F 3/04883* (2022.01)
*G06F 3/04886* (2022.01)

(52) U.S. Cl.
CPC ........ *G06F 40/166* (2020.01); *G06F 3/04883* (2013.01); *G06F 3/04886* (2013.01)

(58) Field of Classification Search
CPC ............... G06F 16/168; G06F 3/04883; G06F 16/30346; G06F 3/0346; G06F 16/444; G06F 3/04886; G06F 40/166
See application file for complete search history.

(56) References Cited

U.S. PATENT DOCUMENTS

| 5,072,412 A | 12/1991 | Henderson, Jr. et al. |
| 5,394,521 A | 2/1995 | Henderson, Jr. et al. |

(Continued)

FOREIGN PATENT DOCUMENTS

WO   2013109510   7/2013

OTHER PUBLICATIONS

Scrivener 1.9.8 for Microsoft Windows User Manual Oct. 2016 pasges 1-356.*

(Continued)

*Primary Examiner* — Justin S Lee
(74) *Attorney, Agent, or Firm* — The Roy Gross Law Firm, LLC; Roy Gross

(57) ABSTRACT

A computer implemented method of creating essays on a computer device is provided, comprising: storing, in a memory storage device in the computer device, one or more files; creating, in an essay drafting software application, a first split screen workspace graphical user interface (GUI), wherein the first split screen workspace GUI includes an essay viewing area and a file viewing area; adding the one or more files to the file viewing area of the first split screen workspace GUI; adding one or more text pages to the essay viewing area of the first split screen workspace GUI; entering text to a first of the one or more text pages using a text editor software application; accessing a first file of the one or more files in the file viewing area of the first split screen workspace GUI through a keystroke performed on one or more keys on a keyboard, wherein the keyboard is adapted to operate as a data and command interface with the computer device and the essay drafting software application; and copying information stored in the first file of the one or more files and pasting the copied information into any one of the one or more text pages.

18 Claims, 18 Drawing Sheets

(56) References Cited

U.S. PATENT DOCUMENTS

| | | |
|---|---|---|
| 6,212,541 B1 | 4/2001 | McAuliffe et al. |
| 6,714,214 B1 | 3/2004 | Demello et al. |
| 7,310,781 B2 | 12/2007 | Chen et al. |
| 7,506,271 B2 | 3/2009 | Wang et al. |
| 7,571,151 B1 | 8/2009 | Fontaine |
| 7,694,222 B2 | 4/2010 | Steen et al. |
| 7,707,518 B2 | 4/2010 | Veselova |
| 7,712,049 B2 | 5/2010 | Williams et al. |
| 7,761,785 B2 | 7/2010 | Veselova et al. |
| 7,774,799 B1 | 8/2010 | Sellers et al. |
| 8,024,652 B2 | 9/2011 | Rasmussen et al. |
| 8,276,090 B2 | 9/2012 | Chen et al. |
| 8,413,040 B2 | 4/2013 | O'Dell-Alexander |
| 8,527,897 B2 | 9/2013 | Eischeid et al. |
| 8,839,150 B2 * | 9/2014 | King .................. G06F 3/017 |
| | | 715/836 |
| 9,252,962 B1 | 2/2016 | Valeti |
| 9,747,257 B2 | 8/2017 | Tse et al. |
| 10,104,082 B2 | 10/2018 | Jones |
| 10,218,709 B2 | 2/2019 | Chandra et al. |
| 10,366,153 B2 | 7/2019 | Sellers et al. |
| 2005/0188329 A1 * | 8/2005 | Cutler .................. G06F 3/0481 |
| | | 715/788 |
| 2006/0074844 A1 | 4/2006 | Frankel et al. |
| 2006/0213754 A1 | 9/2006 | Jarrett et al. |
| 2007/0245223 A1 | 10/2007 | Siedzik et al. |
| 2008/0034307 A1 * | 2/2008 | Cisler .................. G06F 3/04815 |
| | | 715/764 |
| 2008/0244442 A1 | 10/2008 | Veselova et al. |
| 2008/0256114 A1 | 10/2008 | Rasmussen et al. |
| 2009/0307607 A1 | 12/2009 | Schauls et al. |
| 2010/0050129 A1 * | 2/2010 | Li .................. G06F 3/0481 |
| | | 715/849 |
| 2010/0064251 A1 | 3/2010 | Hufnagel et al. |
| 2010/0306698 A1 | 12/2010 | Sellers et al. |
| 2011/0193788 A1 * | 8/2011 | King .................. G06F 3/04883 |
| | | 345/173 |
| 2013/0061120 A1 | 3/2013 | Zeine et al. |
| 2013/0080913 A1 | 3/2013 | Rodrig et al. |
| 2013/0212485 A1 | 8/2013 | Yankovich et al. |
| 2014/0053061 A1 * | 2/2014 | Chasen .................. G06F 3/0485 |
| | | 715/234 |
| 2014/0208418 A1 | 7/2014 | Libin |
| 2016/0110317 A1 | 4/2016 | Tash |
| 2016/0259632 A1 | 9/2016 | Chang et al. |
| 2017/0220567 A1 * | 8/2017 | Masson .................. G06F 40/274 |
| 2018/0307525 A1 | 10/2018 | Gates et al. |
| 2019/0129929 A1 * | 5/2019 | Neylan .................. G06F 40/106 |

OTHER PUBLICATIONS

PCT Search Report for International Application No. PCT/US20/55162, dated Mar. 19, 2021, 5 pp.

PCT Written Opinion for International Application No. PCT/US20/55162, dated Mar. 19, 2021, 10 pp.

Annex to Form/PCT/IS/206 Communication International Search Report of PCT/US20/55162 dated Jan. 26, 2021.

* cited by examiner

COMPUTER BASED UNITARY WORKSPACE LEVERAGING MULTIPLE FILE-TYPE TOGGLING FOR DYNAMIC CONTENT CREATION

CROSS REFERENCE TO RELATED APPLICATIONS

This application claims priority to U.S. Provisional Application No. 62/913,842 entitled "WEB-BASED SOLITARY WORKSPACE LEVERAGING MULTIPLE FILE-TYPE TOGGLING FOR DYNAMIC CONTENT CREATION" filed on Oct. 11, 2019. The content of this application is incorporated by reference into this application in its entirety.

FIELD OF THE INVENTION

The embodiments described herein relate generally to drafting essays and other documents using computer based text/content drafting applications, and more specifically to systems, methods, and modes for a computer-based dynamic content generation application that facilitates document creation through the substantially seamless synthesis of information from multiple reference files and file types to edit text/content within one integrated space.

BACKGROUND OF THE INVENTION

In today's information technology centric economy, many people whom are employed to perform services find that document creation is a significant part of their day-to-day job duties. Such service-centric occupations can include lawyers, engineers, architects, marketing professionals, advertisers, and writers (e.g., newspapers, magazines, web-based blogs/websites, among other types). Most, if not all of these people, use a computer-based device to draft their documents. They will typically use one or more content creating software applications or programs such as Microsoft's® Word, Excel, Visio, PowerPoint, or Apple's® Pages, Numbers, Keynote, Adobe's® Photoshop, and/or other such similar programs from other software manufacturers.

In use, writers (or more commonly referred to as "content creators") commonly have a text editor open on one half of their computer screen and an additional window with notes or reference materials open on the other. Often, drafting a document can require the synthesis of multiple reference sources (e.g., articles, statistics, news reports, etc.), which can require the content creator to search for and open various files manually and then minimize or hide some of them to use at the relevant moment. For example, the content creator may have 5 or more browser tabs open in one window for quick reference and various documents in the form of a portable document form (PDF) (which, as those of skill in the art can appreciate, is a type of document or file format used to present and exchange documents reliably, independent of software, hardware, or operating system, as invented by Adobe), presentations, or previous works minimized out of sight. This results in a multitude of problems that arise from methods to access the files someone needs to develop content. In order to switch between reference documents, one can use a keyboard shortcut (e.g., COMMAND+TAB on a Mac, ALT+TAB/ARROW KEYS on a personal computer (PC)) or drag the mouse to the desired reference document in order to bring that document into an ideal position to read and leverage before returning to the original document and resuming editing/writing. This action can take anywhere from 2-15 seconds and occurs repeatedly throughout the process of creating/drafting the new content.

Subtly, this behavior stunts the creative process, as the content creator is forced to perform a different mental action than composing writing and subsequently reposition within the text editor and possibly re-read multiple sentences to recall the flow of the narrative before continuing. The critical disadvantage with this method is that, regardless of the action for toggling/switching between applications/files, the view of the text editor is impaired if the content creator leverages more than one reference file. For example, when using the shortcut of holding down ALT and using TAB or the ARROW KEYS to toggle back and forth between multiple documents, the text editor is covered.

In addition, the content creator may have to manually size and setup numerous windows (i.e., "graphical user interfaces" (GUIs)) in order to have the ability to view various reference files and a text editor at the same time. The content creator must manually set up, size, and space out the reference files and text editor on one's desktop. The process of re-sizing and setting up can take a considerable amount of time, especially with multiple reference files, and still creates a disjointed collection of files with no way to easily jump from one file to the next. In addition, if even one additional file is added, or taken away, the resizing and manipulation process needs to be repeated.

Furthermore, during the process of manually sifting through a repository of files, the content creator must rely on memory to find useful previous files (e.g., old documents, reference materials) in order to find files that could be useful for developing new content. The content creator must manually navigate through old files, whether on a computer hard drive or in a cloud-based space (e.g., Google Drive) and must do so based on memory. This can take a considerable amount of time, especially if there are multiple reference files that will be leveraged. For example, if the content creator is writing a new cover letter for a job posting, he or she may want to draw inspiration from several old cover letters and a resume. In a similar manner, a journalist writing an article may be crunched for time and want to utilize various groups of previously gathered/produced files and resources. Regardless of the situation, the process of sifting through old files to find the appropriate ones to use is a frustrating and time-intensive activity.

In addition, during the process of creating a new document, the content creator may have to leave multiple files/windows open on a desktop or be forced to recreate the current "layout" of previously open documents/files. If the content creator is creating content using several reference files and wants to take a break from writing and pick up at a later point in time where the content creator left off, the content creator must leave all of those files in their exact locations, minimize some/all of them, or exit out of all or some of the programs and then recreate the desktop arrangement. The latter is an irksome process that can take a significant amount of time, especially if several files are being used. Meanwhile, leaving the files in their locations or minimizing them puts the computer at risk of crashing, which would force the content creator to recreate the desktop arrangement anyway.

The problems described above make content creation using multiple files/documents/sources an inefficient method for maintaining a space for content creation and stunts the creative process by forcing someone to turn attention away from developing content; instead, the content creator spends considerable mental effort and time on setting up their workspace.

Accordingly, a need has arisen for systems, methods, and modes for a computer-based dynamic content generation application that facilitates document creation through the substantially seamless synthesis of information from multiple reference files and file types to edit text/content within one integrated space.

SUMMARY OF THE INVENTION

It is an object of the embodiments to substantially solve at least the problems and/or disadvantages discussed above, and to provide at least one or more of the advantages described below.

It is therefore a general aspect of the embodiments to provide systems, methods, and modes for a computer-based dynamic content generation application that facilitates document creation through the substantially seamless synthesis of information from multiple reference files and file types to edit text/content within one integrated space that will obviate or minimize problems of the type previously described.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Further features and advantages of the aspects of the embodiments, as well as the structure and operation of the various embodiments, are described in detail below with reference to the accompanying drawings. It is noted that the aspects of the embodiments are not limited to the specific embodiments described herein. Such embodiments are presented herein for illustrative purposes only. Additional embodiments will be apparent to persons skilled in the relevant art(s) based on the teachings contained herein.

According to a first aspect of the embodiments, a computer implemented method of creating essays on a computer device is provided, comprising: storing, in a memory storage device in the computer device, one or more files; creating, in an essay drafting software application, a first split screen workspace graphical user interface (GUI), wherein the first split screen workspace GUI includes an essay viewing area and a file viewing area; adding the one or more files to the file viewing area of the first split screen workspace GUI; adding one or more text pages to the essay viewing area of the first split screen workspace GUI; entering text to a first of the one or more text pages using a text editor software application; accessing a first file of the one or more files in the file viewing area of the first split screen workspace GUI through a keystroke performed on one or more keys on a keyboard, wherein the keyboard is adapted to operate as a data and command interface with the computer device and the essay drafting software application; and copying information stored in the first file of the one or more files and pasting the copied information into any one of the one or more text pages.

According to the first aspect of the embodiments, the step of accessing can be performed by one or more voice commands or touch commands.

According to the first aspect of the embodiments, the method further comprises storing, in the memory storage device in the computer device, a plurality of files; creating, in the essay drafting software application, a plurality of single or split screen workspace graphical user interfaces GUIs, wherein each of the plurality of single or split screen workspace GUIs includes a file viewing area; adding at least one file to the file viewing area of each of the single or split screen workspace GUIs; and generating, by the essay drafting software application, an interactive spherically shaped workspace graphical user interface (GUI), into which each of the previously created plurality of single or split screen workspace GUIs occupy respective individual spaces about a substantially horizontal center of the spherically shaped workspace GUI, and wherein the spherically shaped workspace GUI is adapted to be maneuvered and controlled by one or more of voice commands, keyboard commands, and touch commands.

According to the first aspect of the embodiments, each of the one or more of voice commands, keyboard commands, and touch commands can operate to rotate the spherical representation to the left, rotate the spherical representation to the right, open a selected single screen workspace to make available for review its contents, and close the selected single screen workspace and return it to its located on the spherical representation.

According to a second aspect of the embodiments, a computer implemented method of creating essays on a computer device is provided, comprising: storing, in a memory storage device in the computer device, a plurality of files; creating, in an essay drafting software application, a plurality of single screen workspace graphical user interfaces (GUIs), wherein each of the plurality of single screen workspaces includes a file viewing area; adding at least one file to the file viewing area of each of the single screen workspace GUI; and generating, by the essay drafting software application, an interactive spherically shaped workspace GUI, in which each of the previously created plurality of single screen workspaces occupy respective individual spaces about a substantially horizontal center of the interactive spherically shaped workspace GUI, and wherein the interactive spherically shaped workspace GUI is adapted to be maneuvered and controlled by one or more of voice commands, keyboard commands, and touch commands.

According to the second aspect of the embodiments, wherein each of the one or more of voice commands, keyboard commands, and touch commands can operate to rotate the interactive spherically shaped workspace GUI to the left, rotate the interactive spherically shaped workspace GUI to the right, open a selected single screen workspace to make available for review its contents, and close the selected single screen workspace and return it to its location on the interactive spherically shaped workspace GUI.

According to the second aspect of the embodiments, the method further comprises adding an essay viewing area to the single screen workspace GUI to make it a split screen workspace GUI with both an essay viewing area and a file viewing area.

According to the second aspect of the embodiments, the method further comprises adding one or more text pages to the essay viewing area of the first split screen workspace GUI.

According to the second aspect of the embodiments, the method further comprises entering text to a first of the one or more text pages of a first essay viewing area of a first split screen workspace GUI using a text editor software application; accessing a first file of the one or more files in the file viewing area of the first split screen workspace GUI through a keystroke performed on one or more keys on a keyboard, wherein the keyboard is adapted to operate as a data and command interface with the computer device and the essay drafting software application; and copying information stored in the first file of the one or more files and pasting the copied information into any one of the one or more text pages.

According to a third aspect of the embodiments, a computer implemented method of creating essays on a computer device is provided, comprising: storing, in a memory storage device in the computer device, a plurality of files; creating, in an essay drafting software application, a first split screen workspace graphical user interface (GUI), wherein the first split screen workspace GUI includes an essay viewing area and a file viewing area; adding at least one of the plurality of files to the file viewing area of the first split screen workspace GUI; adding one or more text pages to the essay viewing area of the first split screen workspace GUI; creating a plurality of additional workspace GUIs, each of which includes at least one file; displaying the first split screen workspace GUI; and determining, by an adaptive filtering algorithm that is part of the essay drafting software application, one or more recommended workspace GUIs with files that are related to subject matter of text added to the one or more text pages in the essay viewing area of the displayed split screen workspace GUI, or related to subject matter of the at least one file in the file viewing area of the displayed split screen workspace GUI.

According to the third aspect of the embodiments, the method further comprises assembling and displaying in an interactive banner shaped GUI, through use of the adaptive filtering algorithm that is part of the essay drafting software application, the one or more recommended workspace GUIs, and wherein the interactive banner shaped GUI is adapted to be maneuvered and controlled by one or more of voice commands, keyboard commands, and touch commands.

According to the third aspect of the embodiments, each of the one or more of voice commands, keyboard commands, and touch commands can operate to slide the interactive banner shaped GUI to the left, slide the interactive banner shaped GUI to the right, open a selected single screen workspace to make available for review its contents, and close the selected single screen workspace and return it to its location on the interactive banner shaped GUI.

According to the third aspect of the embodiments, the method further comprises adding an essay viewing area to the single screen workspace GUI to make it a split screen workspace GUI with both an essay viewing area and a file viewing area.

According to the third aspect of the embodiments, the method further comprises adding one or more text pages to the essay viewing area of the first split screen workspace GUI.

According to the third aspect of the embodiments, the method further comprises entering text to a first of the one or more text pages of a first essay viewing area of a first split screen workspace GUI using a text editor software application; accessing a first file of the one or more files in the file viewing area of the first split screen workspace GUI through a keystroke performed on one or more keys on a keyboard, wherein the keyboard is adapted to operate as a data and command interface with the computer device and the essay drafting software application; and copying information stored in the first file of the one or more files and pasting the copied information into any one of the one or more text pages.

According to a fourth aspect of the embodiments, a server system adapted to generate essays is provided, the server system comprising: a memory storage device adapted to store instructions and one or more files; a processor coupled to the memory, the processor configured to execute an essay drafting application, the essay drafting application, when stored in the memory storage device and executed by the processor, is adapted to direct the server to: store, in the memory storage device in the server, one or more files; create, in the essay drafting application, a first split screen workspace graphical user interface (GUI), wherein the first split screen workspace GUI includes an essay viewing area and a file viewing area; add the one or more files to the file viewing area of the first split screen workspace GUI; add one or more text pages to the essay viewing area of the first split screen workspace GUI; enter text to a first of the one or more text pages using a text editor software application; access a first file of the one or more files in the file viewing area of the first split screen workspace GUI through a keystroke performed on one or more keys on a keyboard, wherein the keyboard is adapted to operate as a data and command interface with the computer device and the essay drafting application; and copy information stored in the first file of the one or more files and paste the copied information into any one of the one or more text pages.

According to the fourth aspect of the embodiments, accessing the first file of the one or more files in the file viewing area of the first split screen workspace GUI can be performed by one or more of voice commands or touch commands.

According to the fourth aspect of the embodiments, the memory storage device is further adapted to store a plurality of files; the essay drafting software application is further adapted to create a plurality of single or split screen workspace graphical user interfaces GUIs, wherein each of the plurality of single or split screen workspace GUIs includes a file viewing area, and further wherein at least one file is added to the file viewing area of each of the single or split screen workspace GUIs, and further wherein the essay drafting application is further adapted to generate an interactive spherically shaped workspace graphical user interface (GUI), into which each of the previously created plurality of single or split screen workspace GUIs occupy respective individual spaces about a substantially horizontal center of the spherically shaped workspace GUI, and wherein the spherically shaped workspace GUI is adapted to be maneuvered and controlled by one or more of voice commands, keyboard commands, and touch commands.

According to the fourth aspect of the embodiments, each of the one or more of voice commands, keyboard commands, and touch commands can operate to rotate the spherical representation to the left, rotate the spherical representation to the right, open a selected single screen workspace to make available for review its contents, and close the selected single screen workspace and return it to its location on the spherical representation.

According to a fifth aspect of the embodiments, a server system adapted to generate essays is provided, the server system comprising: a memory storage device adapted to store instructions and one or more files; a processor coupled to the memory, the processor adapted to execute an essay drafting application, the essay drafting application, when stored in the memory storage device and executed by the processor, is adapted to direct the server to: create, in the essay drafting application, a plurality of single screen workspace graphical user interfaces (GUIs), wherein each of the plurality of single screen workspaces includes a file viewing area; add at least one file to the file viewing area of each of the single screen workspace GUI; and generate, by the essay drafting application, an interactive spherically shaped workspace GUI, in which each of the previously created plurality of single screen workspaces occupy respective individual spaces about a substantially horizontal center of the interactive spherically shaped workspace GUI, and wherein the interactive spherically shaped workspace GUI is adapted to be maneuvered and controlled by one or more of voice commands, keyboard commands, and touch commands.

According to the fifth aspect of the embodiments, each of the one or more of voice commands, keyboard commands, and touch commands can operate to rotate the interactive spherically shaped workspace GUI to the left, rotate the interactive spherically shaped workspace GUI to the right, open a selected single screen workspace to make available for review its contents, and close the selected single screen workspace and return it to its location on the interactive spherically shaped workspace GUI.

According to the fifth aspect of the embodiments, the essay drafting application is further adapted to add an essay viewing area to the single screen workspace GUI to make it a split screen workspace GUI with both an essay viewing area and a file viewing area.

According to the fifth aspect of the embodiments, the essay drafting application is further adapted to add one or more text pages to the essay viewing area of the first split screen workspace GUI.

According to the fifth aspect of the embodiments, the essay drafting application is further adapted to enter text to a first of the one or more text pages of a first essay viewing area of a first split screen workspace GUI using a text editor application; access a first file of the one or more files in the file viewing area of the first split screen workspace GUI through a keystroke performed on one or more keys on a keyboard, wherein the keyboard is adapted to operate as a data and command interface with the computer device and the essay drafting application; and copy information stored in the first file of the one or more files, and past the copied information into any one of the one or more text pages.

According to a sixth aspects of the embodiments, a server system adapted to generate essays is provided, the server system comprising: a memory storage device adapted to store instructions and one or more files; a processor coupled to the memory, the processor adapted to execute an essay drafting application, the essay drafting application, when stored in the memory storage device and executed by the processor, is adapted to direct the server to: store, in a memory storage device in the computer device, a plurality of files; create, in the essay drafting application, a first split screen workspace graphical user interface (GUI), wherein the first split screen workspace GUI includes an essay viewing area and a file viewing area; add at least one of the plurality of files to the file viewing area of the first split screen workspace GUI; add one or more text pages to the essay viewing area of the first split screen workspace GUI; create a plurality of additional workspace GUIs, each of which includes at least one file; display the first split screen workspace GUI; and determine, by an adaptive filtering algorithm that is part of the essay drafting application, one or more recommended workspace GUIs with files that are related to subject matter of text added to the one or more text pages in the essay viewing area of the displayed split screen workspace GUI, or related to subject matter of the at least one file in the file viewing area of the displayed split screen workspace GUI.

According to the sixth aspect of the embodiments, the system further comprises an adaptive filtering algorithm that is part of the essay drafting application, and wherein the adaptive filtering algorithm is adapted to assemble and display in an interactive banner shaped GUI, through use of the adaptive filtering algorithm that is part of the essay drafting software application, the one or more recommended workspace GUIs, and wherein the interactive banner shaped GUI is adapted to be maneuvered and controlled by one or more of voice commands, keyboard commands, and touch commands.

According to the sixth aspect of the embodiments, each of the one or more of voice commands, keyboard commands, and touch commands can operate to slide the interactive banner shaped GUI to the left, slide the interactive banner shaped GUI to the right, open a selected single screen workspace to make available for review its contents, and close the selected single screen workspace and return it to its location on the interactive banner shaped GUI.

According to the sixth aspect of the embodiments, the essay drafting application is further adapted to add an essay viewing area to the single screen workspace GUI to make it a split screen workspace GUI with both an essay viewing area and a file viewing area.

According to the sixth aspect of the embodiments, the essay drafting application is further adapted to add one or more text pages to the essay viewing area of the first split screen workspace GUI.

According to the sixth aspect of the embodiments, the essay drafting application is further adapted to enter text to a first of the one or more text pages of a first essay viewing area of a first split screen workspace GUI using a text editor application, access a first file of the one or more files in the file viewing area of the first split screen workspace GUI through a keystroke performed on one or more keys on a keyboard, wherein the keyboard is adapted to operate as a data and command interface with the computer device and the essay drafting software application, and copy information stored in the first file of the one or more files and paste the copied information into any one of the one or more text pages.

BRIEF DESCRIPTION OF THE DRAWINGS

The above and other objects and features of the embodiments will become apparent and more readily appreciated from the following description of the embodiments with reference to the following figures. Different aspects of the embodiments are illustrated in reference figures of the drawings. It is intended that the embodiments and figures disclosed herein are to be considered to be illustrative rather than limiting. The components in the drawings are not necessarily drawn to scale, emphasis instead being placed upon clearly illustrating the principles of the aspects of the embodiments. In the drawings, like reference numerals designate corresponding parts throughout the several views.

DETAILED DESCRIPTION OF THE INVENTION

Figure 1:
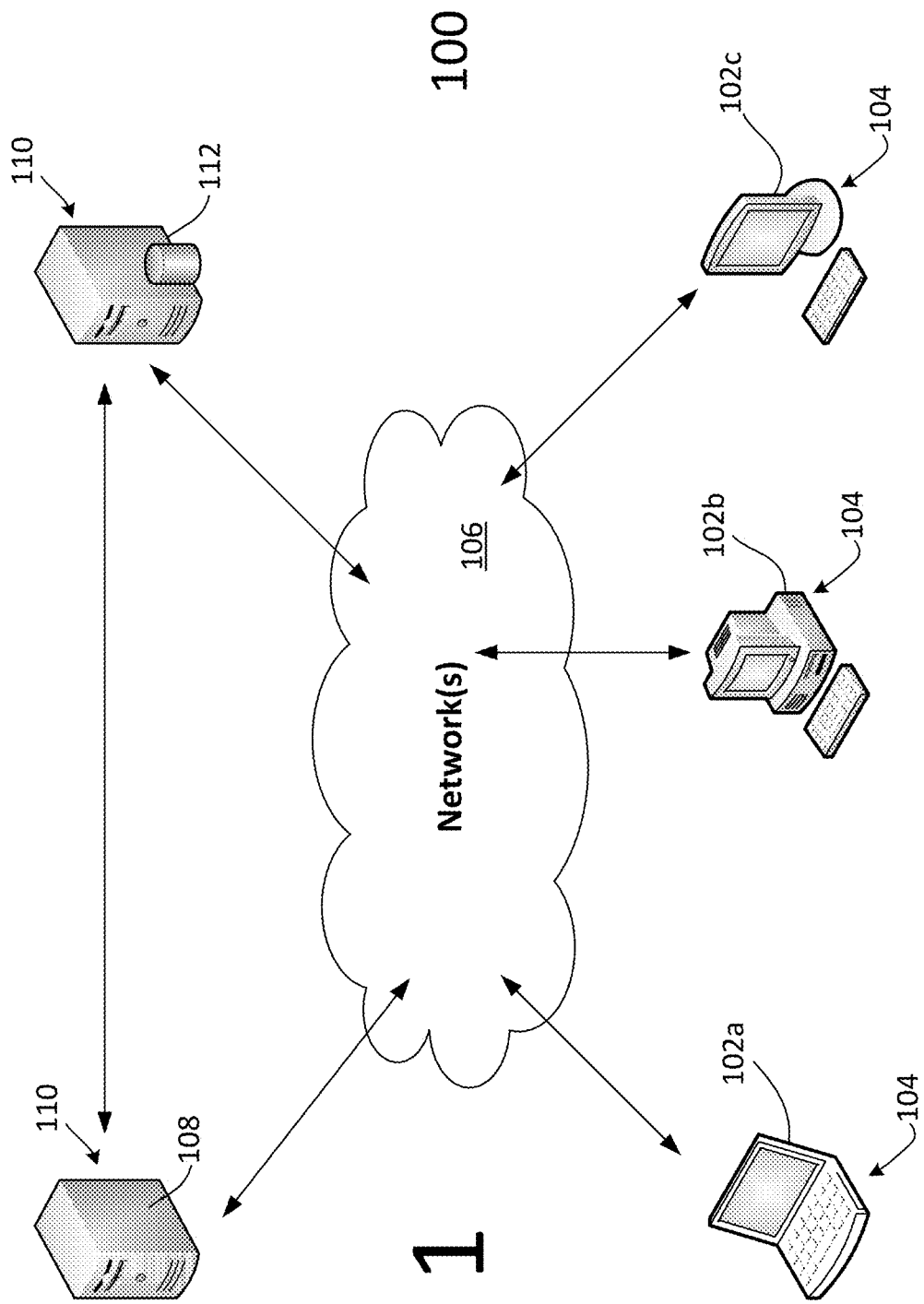
FIG. 1 illustrates a conceptual block diagram of a computing network environment for generating essay documents using one or more additional files or other sources of information according to aspects of the embodiments.

The embodiments are described more fully hereinafter with reference to the accompanying drawings, in which embodiments of the inventive concept are shown. In the drawings, the size and relative sizes of layers and regions may be exaggerated for clarity. Like numbers refer to like elements throughout. The embodiments may, however, be embodied in many different forms and should not be construed as limited to the embodiments set forth herein. Rather, these embodiments are provided so that this disclosure will be thorough and complete, and will fully convey the scope of the inventive concept to those skilled in the art. The scope of the embodiments is therefore defined by the appended claims.

Reference throughout the specification to "one embodiment" or "an embodiment" means that a particular feature, structure, or characteristic described in connection with an embodiment is included in at least one embodiment of the embodiments. Thus, the appearance of the phrases "in one embodiment" or "in an embodiment" in various places throughout the specification is not necessarily referring to the same embodiment. Further, the particular feature, structures, or characteristics may be combined in any suitable manner in one or more embodiments.

LIST OF REFERENCE NUMBERS FOR THE ELEMENTS IN THE DRAWINGS IN NUMERICAL ORDER

The following is a list of the major elements in the drawings in numerical order.
100 Computing Network Environment
102 Personal Electronic Device (PED)
104 PED Essay Generating Application (PED Essay App)
106 Internet/Network (Network)
108 Essay Generating Application Server (Essay App Server)
110 Server Essay Generating Application (Server Essay App)
112 Database/Storage Server (Storage Server)
200 Start View Graphical User Interface (Start View GUI)
202 Create New Graphical User Interface Button (Create New Button)
204 Edit Existing Graphical User Interface Button (Edit Existing Button)
206 Upload New File(s) Graphical User Interface Button (Upload Button)
208 Window Graphical User Interface Manipulation Button (s) (Window Manipulation Buttons)
210 Desktop Work Area
300 Workspace Working Environment (Workspace)
302 Editor Page Add Graphical User Interface Button (Editor Page Add Button)
304 Text Editor Page Delete Graphical User Interface Button (Text Editor Delete Button)
306 Open New Workspace Graphical User Interface Button (Open New Workspace Button)
308 Text Editor Workspace
310a,b Toggle Left/Right Arrow Graphical User Interface (Toggle Left/Right Arrow)
402 Toolbar
404 Content
600 Multi Workspace Views
702 Toggle Down Arrow Graphical User Interface (Toggle Down Arrow)
704 Toggle Up Arrow Graphical User Interface (Toggle Up Arrow)
706 Macro Toolbar Graphical User Interface (Macro Toolbar)
708 Recommended Workspace Collection
710 Mouse Pointer
802 View Layout Configuration and Modification Graphical User Interface Button (View Layout Configuration and Modification Button)
804 Upload Document Graphical User Interface Button (Upload Document Button)
806 Select and Drag Graphical User Interface Button (Select and Drag Button)
808 Open Expanded Workspace Collection Graphical User Interface Button (Open Expanded Workspace Collection Button)
810 Open Interactive Spherical Representative Collection Graphical User Interface Button (Open Interactive Spherical Representative Collection Button)
812 More Functions/Features Graphical User Interface Button (Additional Functions and Features Button)
902 Selected Workspace Collection Graphical User Interface Window (Selected Workspace Collection Window)
904 Files in Selected Workspace Collection (Files)
906 Selected File from Selected Workspace Collection
1002 Expanded Workspace View Graphical User Interface Window (Expanded Workspace View Window)
1004 Search Box Graphical User Interface (Search Box)
1102 Expanded Workspace Spherical View Graphical User Interface Window (Expanded Workspace Spherical View Window)
1202 Webpage Clipper Graphical User Interface Button (Webpage Clipper Button)
1204 Webpage
1206 Webpage Content
1208 Webpage Toolbar
1400 Method for Creating Essay Documents on a Computer Device
1402-1414 Method Steps of Method 1400
1500 Method for Creating Essay Documents on a Computer Device
1502-1508 Method Steps of Method 1500
1600 Method for Creating Essay Documents on a Computer Device
1602-1614 Method Steps of Method 1600
1701 Shell/Box
1702 Integrated Display
1704 Internal Data/Command Bus (Bus)
1706 Processor Internal Memory
1708 Processor(s)
1710 Universal Serial Bus (USB) Port
1711 Ethernet Port
1712 Compact Disk (CD)/Digital Versatile Disk (DVD) Read/Write (RW) (CD/DVD/RW) Drive
1714 Floppy Diskette Drive
1716 Hard Disk Drive (HDD)
1718 Read-Only Memory (ROM)
1720 Random Access Memory (RAM)
1722 Video Graphics Array (VGA) Port or High Definition Multimedia Interface (HDMI)
1724 External Memory Storage Device
1726 External Display
1728 Keyboard
1730 Mouse
1732 Processor Board/PC Internal Memory (Internal Memory)
1734 Flash Drive Memory
1736 CD/DVD Diskettes
1738 Floppy Diskettes
1742 Wi-Fi Transceiver
1744 BlueTooth (BT) Transceiver
1746 Near Field Communications (NFC) Transceiver
1748 Third Generation (3G), Fourth Generation (4G), Long Term Evolution (LTE), Fifth Generation (5G) Cellular Transceiver (Cellular Transceiver)
1750 Communications Satellite/Global Positioning System (Satellite) Transceiver
1752 Antenna
1756 Universal Serial Bus (USB) Cable
1758 Ethernet Cable (CATS Cable)
1760 Printer/Scanner/Facsimile Machine (Printer/Scanner/Fax)
1762 VGA/HDMI Cable
1800 Network System
1802 Mobile Device
1806 Internet Service Provider (ISP)
1808 Modulator/Demodulator (Modem)
1810 Wireless Router
1812 Plain Old Telephone Service (POTS) Provider
1814 Cellular Service Provider
1818 Communication Satellites
1820 Cellular Telecommunications Service Tower (Cellular Tower)
1822 Internet 1824 GPS Station
1826 Satellite Communication Systems Control Station
1828 Global Positioning System (GPS) Satellite

LIST OF ACRONYMS USED IN THE SPECIFICATION IN ALPHABETICAL ORDER

The following is a list of the acronyms used in the specification in alphabetical order.
3G Third Generation
4G Fourth Generation
5G Fifth Generation
API Application Programming Interface
App Executable Software Programming Code/Application
ASIC Application Specific Integrated Circuit
BIOS Basic Input/Output System
BT Bluetooth
CD Compact Disk
CRT Cathode Ray Tube
DVD Digital Video Disk
EEPROM Electrically Erasable Programmable Read Only Memory
FPGA Field Programmable Gate Array
GAN Global Area Network
GPS Global Positioning System
GUI Graphical User Interface
HDD Hard Disk Drive
HDMI High Definition Multimedia Interface
ISP Internet Service Provider
LCD Liquid Crystal Display
LED Light Emitting Diode Display
LTE Long Term Evolution
MODEM Modulator-Demodulator
NFC Near Field Communications
PC Personal Computer
PDA Personal Digital Assistant
PDF Portable Document Form
PED Personal Electronic Device
POTS Plain Old Telephone Service
PROM Programmable Read Only Memory
RAM Random Access Memory
ROM Read Only Memory
RW Read/Write
USB Universal Serial Bus
UV Ultraviolet Light
UVPROM Ultraviolet Light Erasable Programmable Read Only Memory
VGA Video Graphics Array The different aspects of the embodiments described herein pertain to the context of systems, methods, and modes for a computer-based dynamic content generation application that facilitates document creation through the substantially seamless synthesis of information from multiple reference files and file types to edit text/content within one integrated space, but is not limited thereto, except as may be set forth expressly in the appended claims.

As briefly described above, aspects of the embodiments are directed to generating essays or documents that can include content from a plurality of sources, including, but not limited to other documents, files, websites/pages, photographs, illustrations, drawings, links to video images, still photo images, audio files, and any combination thereof, and virtually any other type of electronic content. According to aspects of the embodiments, an application (or a hosted service) can provide content generation and processing capability for different types of content.

Uses of the aspects of the embodiments can include one or more of the following, but is not in any limited thereto: journalism (e.g., a newspaper, such as the "Wall Street Journal"); college applications; college papers; cover letters; professional blogging; academic writing; by authors writing books; ghostwriting; professional research (e.g., Forrester Research); drafting technical documents, such as patents, scientific papers, theses, and the like; drafting legal contracts, and other legal memorandum and court opinions; and business documents, such as specifications, manuals, publications, marketing material, and the like.

Aspect of the embodiments substantially solve the problem described above in regard to users constantly having to resize windows by substantially automatically adjusting the layout of the screen in order to accommodate for the number of reference files used as well as providing a way for the user to choose an optimal layout to meet the purposes/needs of the content being developed, all while still allowing for seamless toggling capabilities between different workspaces 300.

According to further aspects of the embodiments, the problems of leaving multiple files/windows open on a desktop or being forced to recreate the current layout can be substantially diminished or eliminated by implementation of an autosave function to ensure that when the user exits essay generating App 104/110, the most recent view, or "state," is saved, so that the user can choose to go back to the point where work last occurred, at any time, and not have to worry about recreating an optimal space for content creation.

In the following detailed description, references are made to the accompanying drawings that form a part hereof, and in which are shown by way of illustrations, specific embodiments, or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While some embodiments will be described in the general context of program modules that execute in conjunction with an application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those of skill in the art can appreciate that different aspects of the embodiments can be practiced with other computer system configurations, including handheld devices, multiprocessor systems, microprocessor-based or programmable consumer electronics, minicomputers, mainframe computers, and comparable computing devices. Aspects of the embodiments can also be practiced in distributed computing environments where tasks are performed by remote processing devices that are linked through a communications network. In a distributed computing environment, program modules can be located in both local and remote memory storage devices.

Aspects of the embodiments can be implemented as a computer-implemented process (method), a computing system, or as an article of manufacture, such as a computer program product or computer readable media. The computer program product can be a computer storage medium readable by a computer system and encoding a computer program that comprises instructions for causing a computer or computing system to perform example process(es). The computer-readable storage medium is a computer-readable memory device. The computer-readable storage medium can for example be implemented via one or more of a volatile computer memory, a non-volatile memory, a hard drive, a flash drive, a floppy disk, or a compact disk, and comparable hardware media.

Throughout this specification, the term "platform" can be a combination of software and hardware components for providing share permissions and organization of content in an application with multiple levels of organizational hierarchy. Examples of platforms include, but are not limited to, a hosted service executed over a plurality of servers, an application executed on a single computing device, and comparable systems. The term "server" generally refers to a computing device executing one or more software programs typically in a networked environment. More detail on these technologies and example operations is provided below.

A computing device, as used herein, refers to a device comprising at least a memory and one or more processors that includes a server, a desktop computer, a laptop computer, a tablet computer, a smart phone, a vehicle mount computer, or a wearable computer. A memory can be a removable or non-removable component of a computing device configured to store one or more instructions to be executed by one or more processors. A processor can be a component of a computing device coupled to a memory and configured to execute programs in conjunction with instructions stored by the memory. Actions or operations described herein may be executed on a single processor, on multiple processors (in a single machine or distributed over multiple machines), or on one or more cores of a multi-core processor. An operating system is a system configured to manage hardware and software components of a computing device that provides common services and applications. An integrated module is a component of an application or service that is integrated within the application or service such that the application or service is configured to execute the component. A computer-readable memory device is a physical computer-readable storage medium implemented via one or more of a volatile computer memory, a non-volatile memory, a hard drive, a flash drive, a floppy disk, or a compact disk, and comparable hardware media that includes instructions thereon to automatically save content to a location. A user experience can be embodied as a visual display associated with an application or service through which a user interacts with the application or service. A user action refers to an interaction between a user and a user experience of an application or a user experience provided by a service that includes one of touch input, gesture input, voice command, eye tracking, gyroscopic input, pen input, mouse input, and keyboards input. An application programming interface (API) can be a set of routines, protocols, and tools for an application or service that allow the application or service to interact or communicate with one or more other applications and services managed by separate entities.

While example implementations are described using notebook applications herein, embodiments are not limited to a notebook application. As discussed previously, different types of content (in form of documents or other structured data) can be integrated within one type of application (for example, a spreadsheet application including word processing documents, presentation documents, and other content inserted within a spreadsheet), or a separate application can combine content from a variety of applications. Different types of content can include, but are not limited to, word processing documents, spreadsheets, notes, emails, other forms of communication recordings, presentations, graphics, images, audio data, video data, and comparable ones. Furthermore, an organizational structure of an application according to embodiments are not limited to the examples discussed herein. Content can be structured in different forms of hierarchical structures within the containers used by the application.

Technical advantages exist for generating essays utilizing the aspects of the embodiments that include displaying one or more essays (the documents to be generated or created), and displaying, in a same display, additional documents, files, images, or webpage/website links, as well as generating, through use of an algorithm that is part of the application, further related documents, files, images, and webpage/website links. Such technical advantages can include, but are not limited to, the ability to switch among different sources of content information without having to resize or re-apportion the displayed documents and files, such that copying and pasting such content information is much easier than the systems and methods currently available so that little to no time is lost in such transfers, meaning that there is a substantially greater possibility of uninterrupted train of thought in generating such essay documents.

Aspects of the embodiments address a need that arises from very large scale of operations created by networked computing and cloud-based services that cannot be managed by humans. The actions/operations described herein are not a mere use of a computer, but address results of a system that is a direct consequence of software used as a service such as communication services offered in conjunction with communications.

While some embodiments will be described in the general context of program modules that execute in conjunction with an application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those skilled in the art can appreciate that aspects of the embodiments can be practiced with other computer system configurations, including hand-held devices, multiprocessor systems, microprocessor-based or programmable consumer electronics, minicomputers, mainframe computers, and comparable computing devices. Aspects of the embodiments can also be practiced in distributed computing environments where tasks are performed by remote processing devices that are linked through a communications network. In a distributed computing environment, program modules can be located in both local and remote memory storage devices.

Some aspects of the embodiments can be implemented as a computer-implemented process (method), a computing system, or as an article of manufacture, such as a computer program product or computer readable media. The computer program product can be a computer storage medium readable by a computer system and encoding a computer program that comprises instructions for causing a computer or computing system to perform example process(es). The computer-readable storage medium is a computer-readable memory device. The computer-readable storage medium can, for example, be implemented via one or more of a volatile computer memory, a non-volatile memory, a hard drive, a flash drive, a floppy disk, or a compact disk, and comparable hardware media, among other types of storage media.

Throughout this specification, the term "platform" can be a combination of software and hardware components for providing systems, methods, and modes for a computer-based dynamic content generation application that facilitates document creation through the substantially seamless synthesis of information from multiple reference files and file types to edit text/content within one integrated space. Examples of platforms include, but are not limited to, a hosted service executed over a plurality of servers, an application executed on a single computing device, and comparable systems. The term "server" generally refers to a computing device executing one or more software programs typically in a networked environment. More detail on these technologies and example operations is provided below.

A computing device, as used herein, refers to a device comprising at least a memory and one or more processors that includes a server, a desktop computer, a laptop computer, a tablet computer, a smart phone, a vehicle mount computer, or a wearable computer. A memory can be a removable or non-removable component of a computing device adapted to store one or more instructions to be executed by one or more processors. A processor can be a component of a computing device coupled to a memory and adapted to execute programs in conjunction with instructions stored by the memory. Actions or operations described herein can be executed on a single processor, on multiple processors (in a single machine or distributed over multiple machines), or on one or more cores of a multi-core processor. An operating system can be a system adapted to manage hardware and software components of a computing device that provides common services and applications. An integrated module can be a component of an application or service that can be integrated within the application or service such that the application or service can be adapted to execute the component. A computer-readable memory device can be a physical computer-readable storage medium implemented via one or more of a volatile computer memory, a non-volatile memory, a hard drive, a flash drive, a floppy disk, or a compact disk, and comparable hardware media that includes instructions thereon to substantially automatically save content to a location. A user experience can be a visual display associated with an application or service through which a user interacts with the application or service. A user action refers to an interaction between a user and a user experience of an application or a user experience provided by a service that includes one of touch input, gesture input, voice command, eye tracking, gyroscopic input, pen input, mouse input, and keyboards input, among other types of inputs. An API can be a set of routines, protocols, and tools for an application or service that allow the application or service to interact or communicate with one or more other applications and services managed by separate entities.

While example implementations are described using notebook applications herein, aspects of the embodiments are not limited to a notebook application. As discussed previously, different types of content (in form of documents or other structured data) can be integrated within one type of application (for example, a spreadsheet application including word processing documents, presentation documents, and other content inserted within a spreadsheet), or a separate application can combine content from a variety of applications and allow hierarchical organization of such data. Different types of content can include, but are not limited to, word processing documents, spreadsheets, notes, emails, other forms of communication recordings, presentations, graphics, images, audio data, video data, and comparable ones. Furthermore, an organizational structure of an application according to aspects of the embodiments are not limited to the examples discussed herein. Content can be structured in different forms of hierarchical structures within the containers used by the application.

FIGS. 2-18 illustrate various aspects of an essay generating program or application for use on one or more computing devices, including, according certain aspects of the embodiments, use of the internet or other similar networks. The essay generating program provides a practical, technical solution to the problem of integrating content from a multitude of sources; as those of skill in the art can appreciate, the aspects of the embodiments has no "analog equivalent" as its embodiments reside solely or substantially in the physical device or computer domain. That is, integrating diverse sources of content—whether it is text from another document, a photo from another document, or a photo, or video, or link to a website/webpage, or an audio clip, always meant, and continues to mean, using practical, non-abstract physical devices. The technological improvement of the aspects of the embodiments resides in at least in the ability to quickly and easily integrate content from a plurality of content sources, but also in determining, using an algorithm, relevant content in other files or documents that have not been previously selected by the user. In addition, such aspects of the embodiments have no "analog equivalents" because the algorithm not only selects the related relevant content filled documents/files automatically, but it represents the documents in a manner that can only be done on a computer, and it allows a user to manipulate the relevant related documents using many different types of commands none of which could be accomplished without a computer or some other technological equivalent.

FIG. 1 illustrates a conceptual, non-limiting, block diagram of computing network environment 100 for generating essay documents using one or more additional files or other sources of information according to aspects of the embodiments.

As shown in FIG. 1, essay generating application (App) server host (essay App server) 108 can execute essay generating parent application (parent essay App) 110 that alone, or in combination with personal electronic device (PED) essay generating local application (PED essay App) 104 (used and stored in personal electronic device(s) (PED) 102a-c) provides the capability to create and edit content. Computing network environment 100 can also include database/storage server (database server) 112, which can enable storing and sharing of created or edited content among users (not shown). Database server 112 can interface with essay App server 108 directly or through Internet/network (network) 106. Network 106 can also interface with PEDs 102a-c with essay App server 108 according to aspects of the embodiments. Created or edited content can be stored in one or more data stores (for example, local data stores in users' PEDs, cloud storage, and so on), some of which may be managed by a database server 112. The content and associated data may be managed by multiple servers. Similarly, PED essay generating application (essay App) 110 (or hosted service) can be executed on other multiple servers as well.

Users can access either or both of essay PED essay App 104 and server essay App 110 through PEDs 102a-c. As those of skill in the art can appreciate, the essay generating application can be embodied as either a sold or licensed stand-alone software product, or it can be sold or licensed and embodied in the form as shown in FIG. 1, that is, a portion on PEDs 102a-c and a portion on server App 110; for the purposes of this discussion, from hereon in, the essay generating application will be presumed to be adapted to be in the latter configuration, but both applications will be referred to as essay generating App 104/110 in fulfillment of the dual purposes of clarity and brevity.

Network 106 can be one or more different or separate networks, and can provide wired or wireless communications between nodes, such as PEDs 102a-c, or servers 108, 112. According to aspects of the embodiments, essay generating App 104/110 can also be locally executed on a user's computing device e.g., PED 102a-c. To process the content and enable sharing of the content, essay generating App 104/110 can provide a user experience to the users. The user experience can be a visual display through which the users can interact with essay generating App 104/110. The interactions can include a touch input, a gesture input, a voice command, eye tracking, a gyroscopic input, a pen input, mouse input, and/or a keyboards input, among others. As discussed in further detail below, the user experience can provide visual indications of sharing status of content such as documents, portions of documents, collations of documents, etc.

PEDs 102a-c can each include a display device, such as a touch enabled display component, and a monitor, among others, to provide access to essay generating App 104/110 for the users through a web browser (thin client) or a local client application (thick client). PEDs 102a-c can include a desktop computer, a laptop computer, a tablet, a handheld device, a vehicle mount computer, an embedded computer system, a smart phone, and a wearable computer, among other computing devices, for example.

While computing network environment 100 as illustrated in FIG. 1 has been described with specific components including servers 108, 112, PEDs 102a-c, network 106, essay generating App 104/110, aspects of the embodiments are not limited to these components or system configurations and can be implemented with other system configuration employing fewer or additional components.

Figure 2:
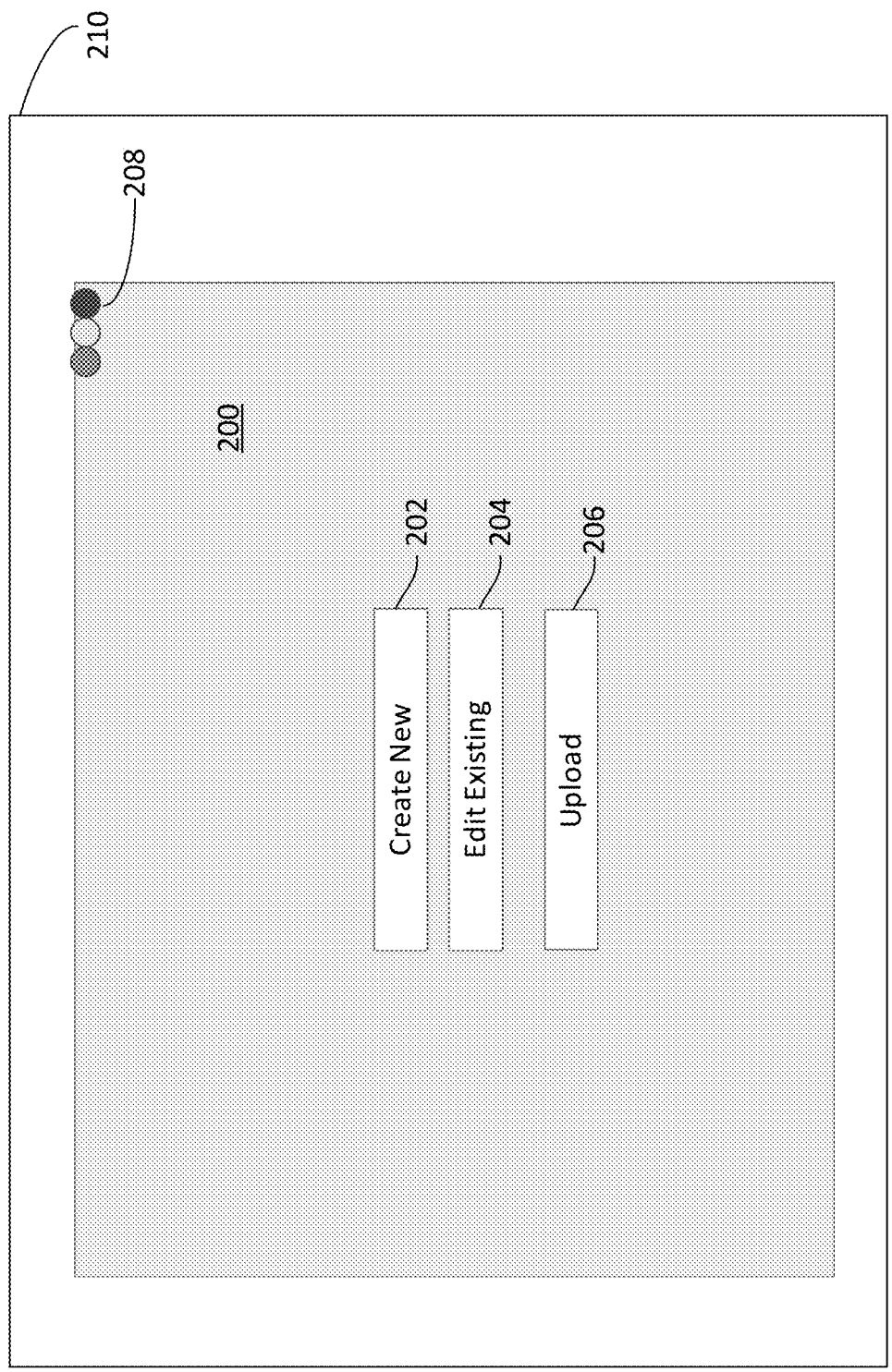
FIG. 2 illustrates a graphical user interface displayed on a desktop work area of a personal electronic device representing a start or opening view when a user first uses or opens an essay generating software application in a computing network environment according to aspects of the embodiments.

FIG. 2 illustrates a graphical user interface on desktop work area 210 of PED 102 representing a start or opening GUI view (start view GUI 200) when a user first uses or opens essay generating App 104/110 in computing network environment 100 according to aspects of the embodiments. Start view GUI 200 is displayed on desktop work area 210 that is displayed on the monitor/display associated with PED 102. In several of the following Figures, desktop work area 210 has been omitted in fulfillment of the dual purposes of clarity and brevity, although those of skill in the art can appreciate that desktop work area is can be part of any computer operated application, software, or program, that requires or involves input/interface with a user.

Upon logging in, the user will be taken to start view GUI 200. Several GUI buttons exist in start view GUI 200; as those of skill in the art can appreciate, "buttons" are GUI's areas defined within the window view that a user can interact with to perform different functions. Several of the buttons shown in start view GUI 200 are known to those of skill in the art, and therefore, a detailed discussion of how they operate is both not needed to understand the aspects of the embodiments, and beyond the scope of this discussion, and therefore, in fulfillment of the dual purposes of clarity and brevity, a detailed discussion of their operation has been omitted here-from. Shown in FIG. 2 are create new GUI button 202 (from hereon in, reference to any GUI button shall omit the nomenclature "GUI" as such is presumed to be the manner in which the button or toolbar operates, unless otherwise described), edit existing button 204, upload new file(s) button (upload button) 206, among others. Also shown in FIG. 2 are a plurality of window manipulation buttons 208 that represent known window GUI functions, such as minimize, maximize, close, among other types.

If a user clicks on create new button 202, the user can create a new single workspace view with a single text editor. The term "clicks on" is known to those of skill in the art, and therefore, in fulfillment of the dual purposes of clarity and brevity, a detailed discussion has been omitted here-from. If the user clicks on edit existing button 204, the user is directed to select an existing (i.e., a previously created) workspace, or to return to the most recent view. If the user clicks on upload button 206, then essay generating app 104/110 imports one or more new file(s) into a new or existing workspace.

Figure 3:
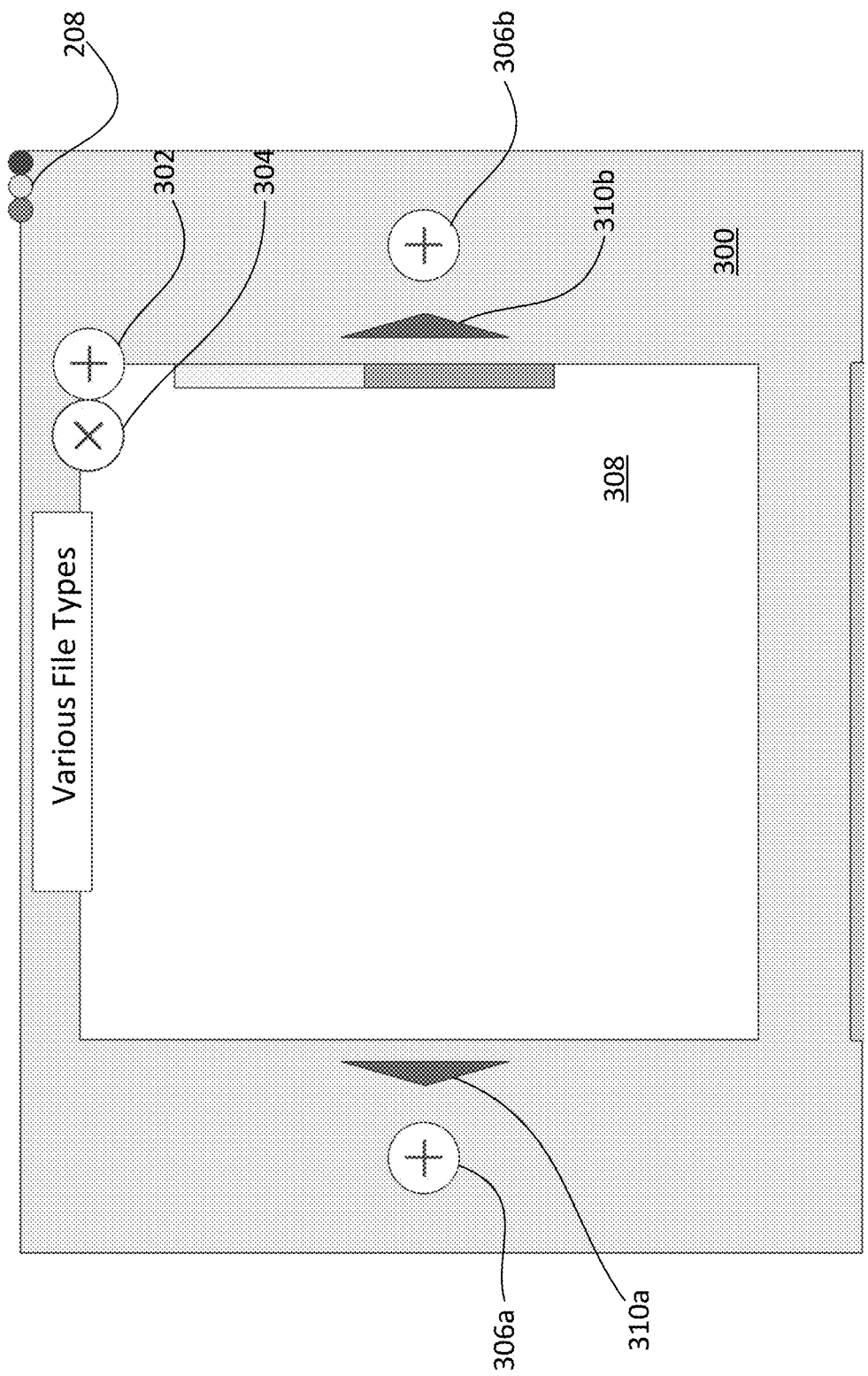
FIG. 3 illustrates a graphical user interface representing a single view workspace working environment that a user encounters following selection of a create new button graphical user interface as shown in FIG. 2 according to aspects of the embodiments.
Figure 5:
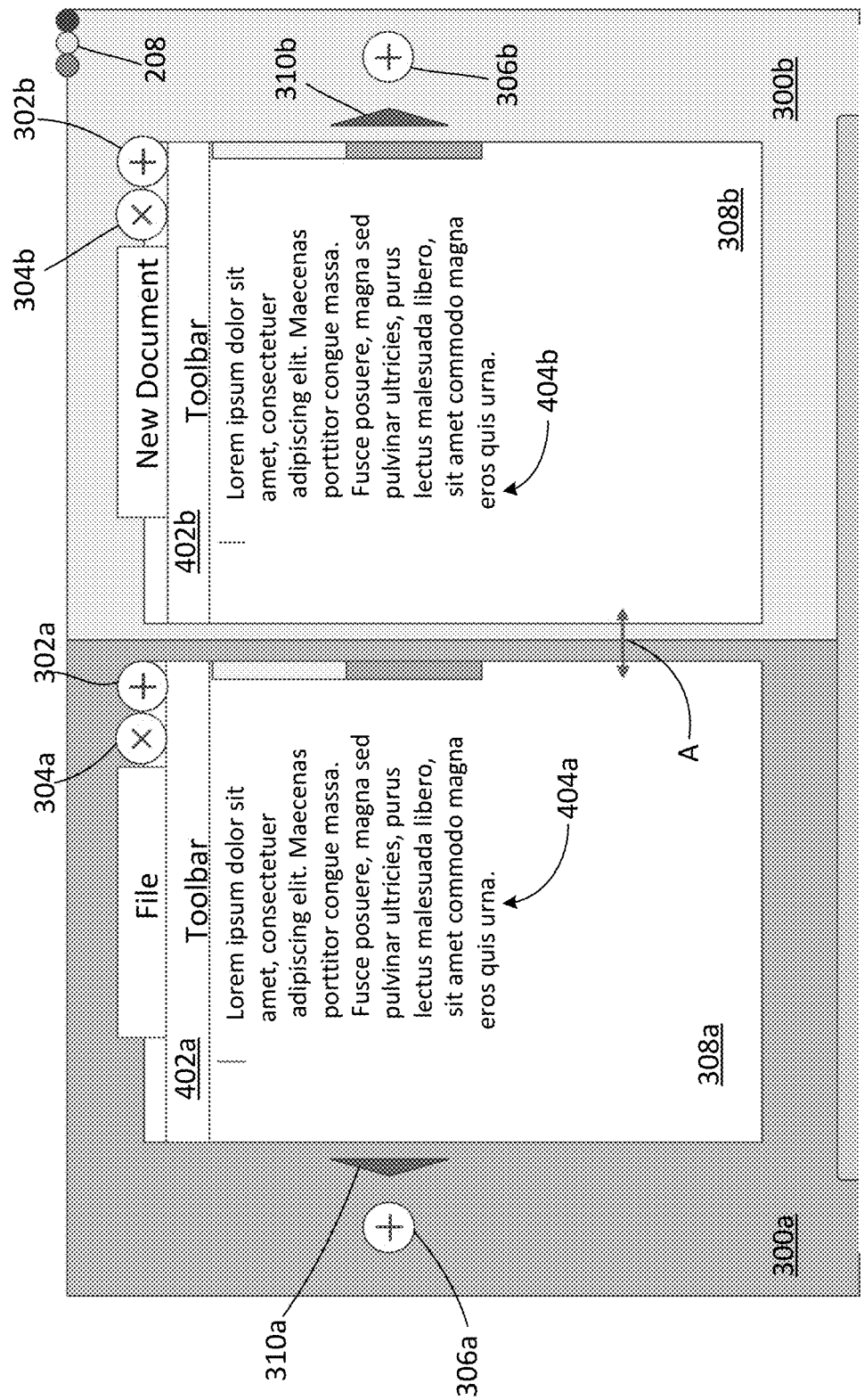
FIG. 5 illustrates a split screen graphical user interface workspace that can be used to generate content in either or both workspaces and access content in either or both workspaces when operating the essay generating software application in a computing network environment according to aspects of the embodiments.

FIG. 3 illustrates a graphical user interface representing single view workspace working environment (workspace working environment (workspace)) 300 with text editor workspace 308 added that a user encounters following selection of create new button 202 as shown in FIG. 2 according to aspects of the embodiments. FIG. 3 illustrates a single view workspace 300 that the user will see after clicking on, or selecting create new button 202 as shown in FIG. 2, and after clicking or selecting open new workspace button 306a,b; that is, single view workspace 300, when first created, does not have text editor workspace 308 located therein. If a first text editor workspace 308 is open, and then the open new workspace 306a,b is clicked or selected, then a second workspace is opened (as shown in FIG. 5, described below).

The GUI generated by aspects of the embodiments shown in FIG. 3 illustrates the results of several actions by the user. First, upon clicking or selecting create new button 202, the single view workspace 300 appears on the monitor of PED 102 being used by the user. The user can then click or select editor page add button 302 to generate or create text editor workspace 308 as shown in FIG. 3. Selection of editor page add button 302 can occur through one or more keyboard commands, such as pressing CTRL+N. According to further aspects of the embodiments, selection of editor page add button 302 can occur by one or more of keyboard commands, voice commands, touch commands, mouse pointer 710, among other interface operations. As those of skill in the art can appreciate, the nomenclature KEY1+KEY2 means that the user presses first on KEY1 then, while keeping KEY1 pressed down, presses down KEY2, whereupon the "keyboard command shortcut"—i.e., whatever the keyboard functional command is programmed to those combination of keyboard entries in the program or application within which the user is operating—is performed. Thus, in this case, the user would first press down the CTRL key, and then the "N" key (which does not necessarily indicate an uppercase version of the letter). From here on in, in fulfillment of the dual purposes of clarity and brevity, the manner of entering keyboard commands shall be presumed to operate in a substantially similar manner as to the above, unless otherwise noted. According to further aspects of the embodiments, examples of keyboard commands are given for many of the interactive GUI buttons shown in the Figures; such keyboard commands should not be taken in a limiting manner, meaning that additional and/or different commands, as well as voice commands, or touch screen commands can be used interchangeably or in-place of the buttons.

Text editor workspace 308 is the location wherein content can be created or generated by the user. That is, with the use of a text editor, similar to conventional text/word processing generating applications currently available, content in the form of text, drawings/illustrations, tables, graphs and the like can be created or imported. Various file types, include, but are not limited to, .docx, .doc, .pdf, .ppt, .xlsx, .jpg, .png, among others, the types denoted by their filename extensions (e.g., ".xyz" being well known to those of skill in the art. Thus, the use of the word "text" is not meant to be and should not be taken to be limited to typed text (e.g., typed words . . . ), but is intended and does encompass much more. In addition, content (or text) further comprises photos, images from videos, content from webpages/websites, links to webpages/websites, audio/video clips (or links to the same, wherein such links can include a link to a particular file (such as .wave file, or .jpeg file) or to a webpage/website, and the like. In short, any kind of content that can be generated or obtained and imported can be place or located (typically involving a "cut and paste" operation, as known to those of skill in the art) within text editor workspace 308 according to aspects of the embodiments.

When operating within the single view workspace 300, a user can perform other operations as well according to further aspects of the embodiments. Following creating or generation of first text editor workspace 308, additional workspaces 308*b-n* can be generated by clicking on editor page add button 302, or through use of keyboard command CTRL+N. If the user clicks or selects text editor delete button 304 (keyboard command CTRL+DEL), then the current text editor workspace 308 is deleted. Furthermore, any delete or remove command described herein can generate a confirmation GUI, the operation of which is known to those of skill in the art.

Also shown in FIG. 3 are open new workspace buttons 306*a,b*, and left-right toggle arrows 310*a,b*. Clicking or selecting either of open new workspace buttons 306*a,b* (selection occurring through pressing of keyboard keys CTRL+SHIFT+L) generates a new editable, dynamic workspace to the left or right of the current workspace to create a split-screen view, as shown in FIG. 5, wherein one or text editor workspaces can be opened, or content files added, as described in greater detail below. Clicking on either left-right arrows 310*a,b* provides the ability to switch or "toggle" between different workspaces 300 to the left or right of the current selected workspace according to aspects of the embodiments. The scroll bars on the right side of workspace 300 operates in a substantially similar manner as when used in other computer applications, as can be appreciated by those of skill in the art. According to further aspects of the embodiments, the toggling function provided by arrows 310*a,b* can also be provided by one or more of keyboard commands, voice commands, touch commands, mouse pointer 710, among other interface operations.

Figure 4:
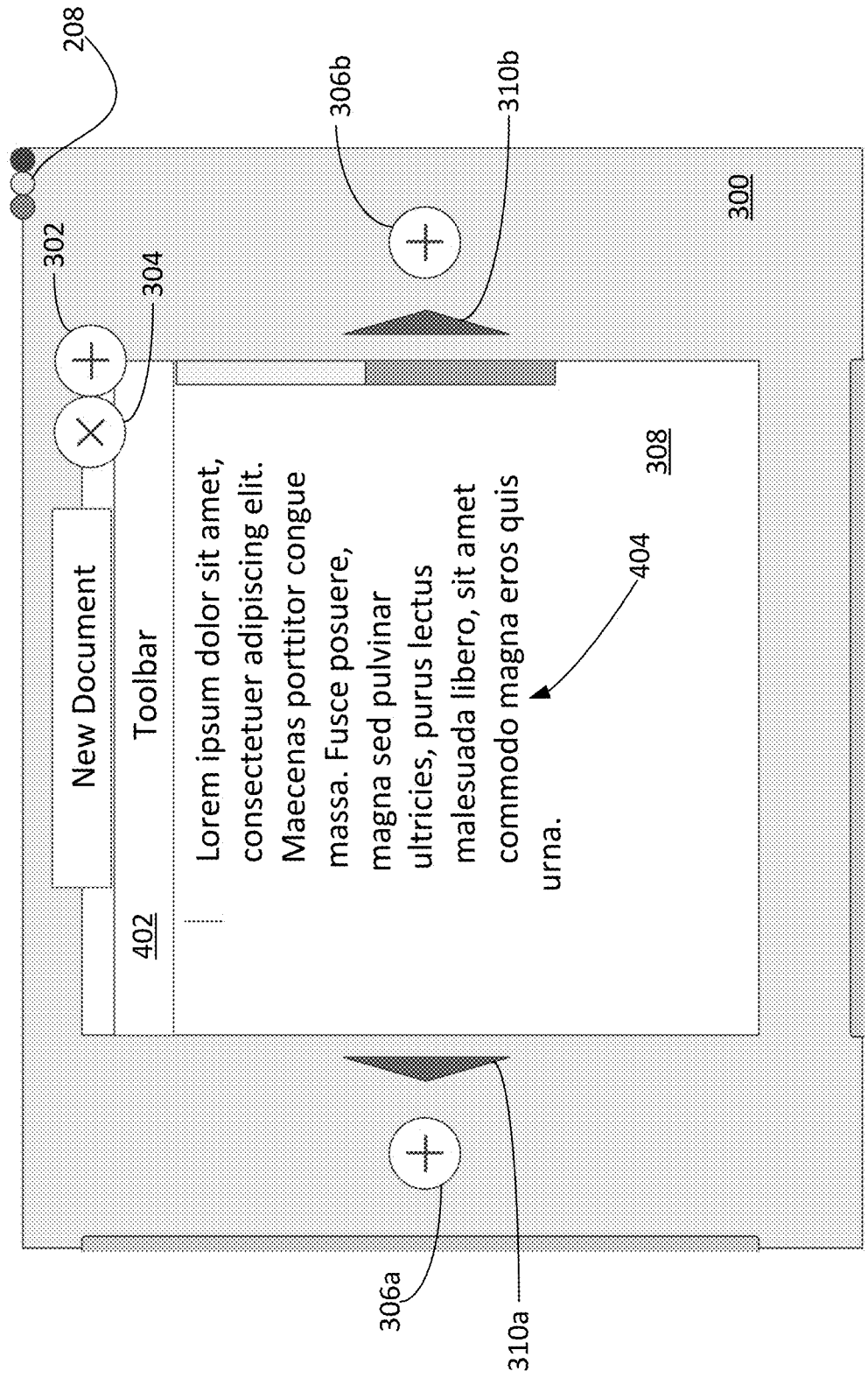
FIG. 4 illustrates the single view workspace working environment of FIG. 3 with the addition of content that a user has added following insertion of a text editor workspace when using the essay generating software application in a computing network environment according to aspects of the embodiments.

FIG. 4 illustrates the single view workspace 300 of FIG. 3 with the addition of content 404 that a user has added following insertion of text editor workspace 308 when using essay generating App 104/110 in computing network environment 100 according to aspects of the embodiments. In FIG. 4, the user has added content 404 through use of a proprietary text editor (or one or more conventional word processing programs/applications through use of special licensing arrangements). Shown on the top of workspace 308 is toolbar 402 that can contain one or more GUI buttons that perform text editing functions; such text editing functions can include those known to those of skill in the art, as well as others particular to the aspects of the embodiments.

FIG. 5 illustrates a split screen GUI with first workspace 300*a* and second workspace 300*b*, wherein content can be generated in either or both workspaces 300*a,b* and content can be accessed in either or both workspaces 300*a,b* when operating the essay generating software application in computing network environment 100 according to aspects of the embodiments.

FIG. 5 illustrates a split-screen view that is displayed on a monitor associated with PED 102 being used with essay generating App 104/110, which is comprised of first and second workspaces 300*a,b* side-by-side according to aspects of the embodiments. All of the same elements and capabilities offered within a general workspace (shown in FIG. 4) are preserved in the separate workspaces 300*a,b* displayed in the split-screen view (or any other kind of view). That is, each workspace 300*a,b* includes a respective text editor workspace 308, toolbar 402, editor page add button 302, editor page delete button 304, and, in this case, first content 404*a*, and second content 404*b*. Overlaid in the split screen view of workspaces 300*a,b* is toggle left/right arrows 310*a,b* and open new workspace buttons 306*a,b*, as well as window manipulation buttons 208 according to aspects of the embodiments. Selection of the current workspace 300 is indicated by the darker background (which can be a user settable variable). The user can substantially seamlessly toggle back and forth between each workspace 300*a,b* (and its respective text editor workspace 308*a,b*)—as indicate by arrow A—by clicking toggle left/right arrows 310*a,b*, or using a keyboard command such as CTRL+LEFT ARROW. According to further aspects of the embodiments, toggling can occur by one or more of keyboard commands, voice commands, touch commands, mouse pointer 710, among other interface operations.

According to aspects of the embodiments, the workspace views of FIG. 5 demonstrates the high-level basic solution to the problem previously discussed. In a designed split screen view, one is able to select a first workspace 300*a* (light green) to edit a document while referencing a second document, in second workspace 300*b*. The user is able to write in either first or second workspace 300*a,b*, provided it is a text editor workspace 308*a,b*. To switch from one workspace 300 to the other, the user can use a keyboard command (e.g., CTRL+RIGHT/LEFT ARROW). According to further aspects of the embodiments, clicking the arrow twice will result in moving to another workspace 300*x* outside of the split screen view. According to further aspects of the embodiments, the user can use a keyboard command (e.g., CTRL+UP/DOWN ARROW) to switch between multiple "building block pieces" within a single workspace 300. This action of switching between various files both horizontally and vertically can be referred to as "toggling." Auto saving of documents created or edited can be incorporated according to further aspects of the embodiments. The ability to toggle between documents within the split screen view as shown in FIG. 5, and as described above and below will augment the speed and efficiency of finding materials, synthesizing information, and ultimately drafting written documents according to aspects of the embodiments.

Figure 6:
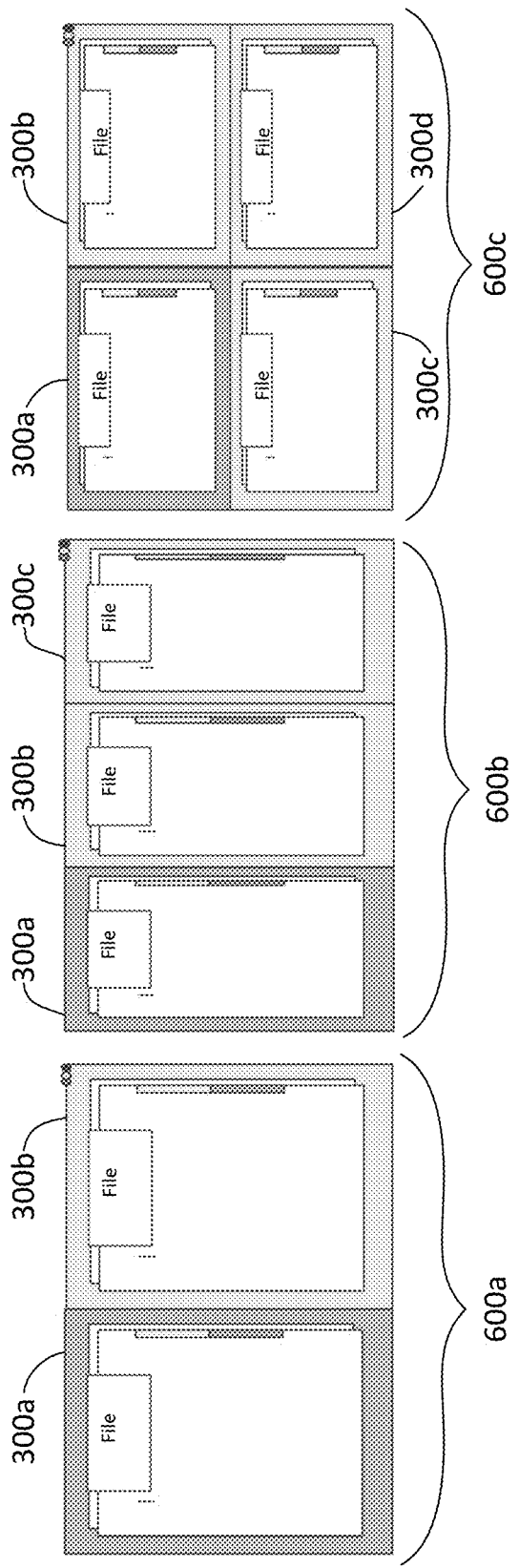
FIG. 6 illustrates a plurality of multi split screen graphical user interface views for generating content and/or viewing content filled files in any of the workspaces when a user operates the essay generating software application in a computing network environment according to aspects of the embodiments.

FIG. 6 illustrates a plurality of multi split screen graphical user interface views (multi workspace view) 600*a-c* for generating content and/or viewing content filled files in any of the workspaces 300 when a user operates essay generating App 104/110 in a computing network environment according to aspects of the embodiments. Multi workspace view 600*a* is substantially similar to that as shown in FIG. 5—it is a two workspace 300*a,b* workspace environment. In multi workspace view 600*b* there are three workspaces 300*a-c*, and in multi workspace view 600*c* there are four workspaces 300*a-d*, according to aspects of the embodiments. According to aspects of the embodiments, the only limit to the number of workspaces 300 that can be opened and viewed is limited by the size/resolution of the monitor associated with PED 102 and its associated processing capabilities; for most applications however, 2-4 workspaces 300 suffices to contain the number of text editor workspaces 308 typically used.

Figure 7:
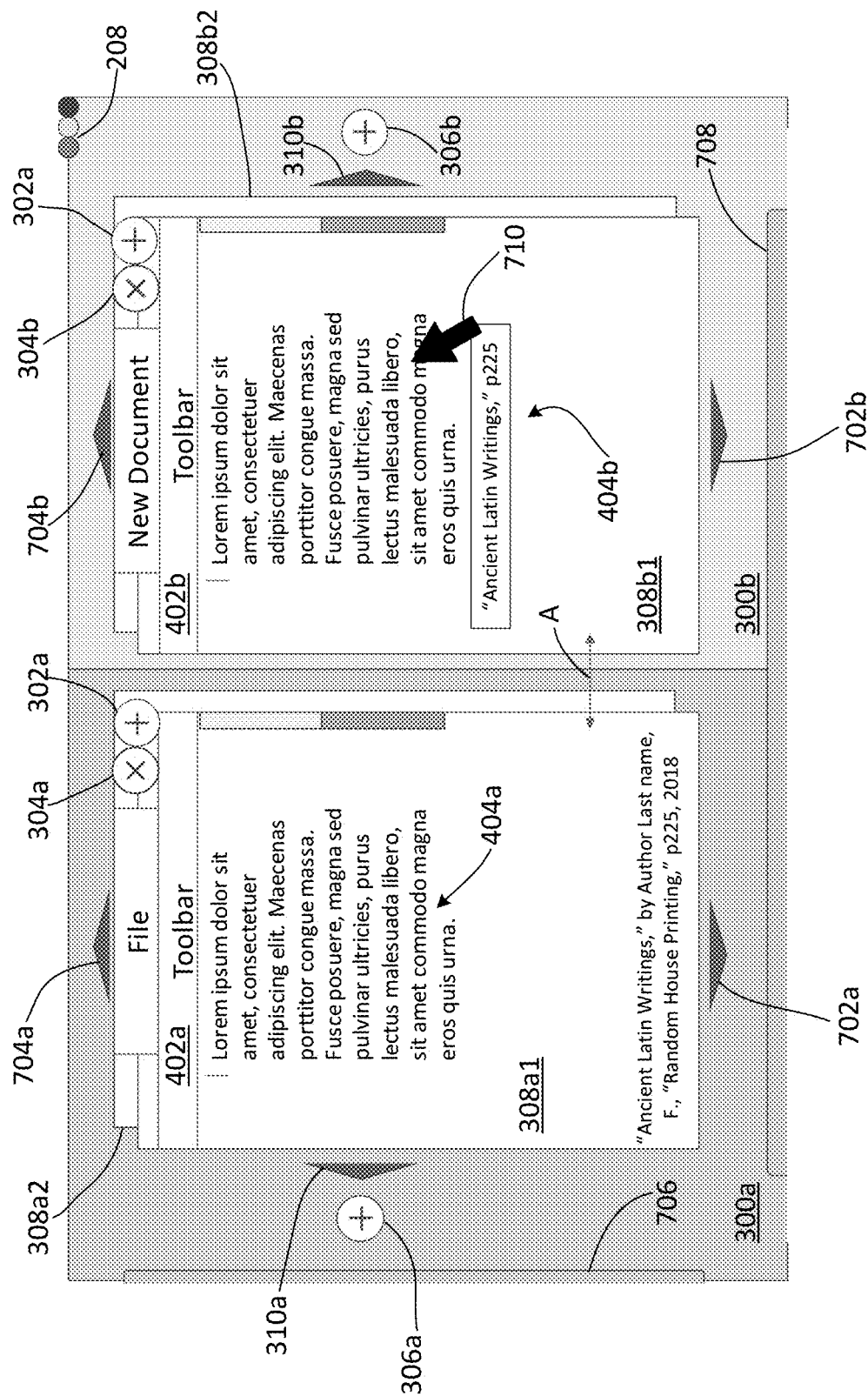
FIG. 7 illustrates a split screen view graphical user interface, similar to that of FIG. 5, wherein one screen comprises a plurality of content files, and a second screen comprises a plurality of files for generating content when operating the essay generating software application in a computing network environment according to aspects of the embodiments.

FIG. 7 illustrates a split screen view graphical user interface, similar to that of FIG. 5, wherein one screen comprises a plurality of content files, and a second screen comprises a plurality of files for generating content when operating the essay generating software application in computing network environment 100 according to aspects of the embodiments.

FIG. 7 illustrates what the user will see in a split-screen view when there are multiple files in each workspace 300*a*, 300*b* (i.e., when there is a "stack" in each workspace 300). FIG. 7 is substantially similar to that of FIG. 5, with the exception of the additional files in each respective workspace 300, and includes the same features and functions, and therefore, in fulfillment of the dual purposes of clarity and brevity, the features and functions will not be discussed again. In the split-screen view of FIG. 7, which would be displayed on a monitor associated with the PED 102 the user is working with, the user can seamlessly toggle back and forth between files in each respective workspace 300*a,b* by either clicking the toggle up arrows 704*a,b*, or toggle down arrows 702*a,b*, or using a keyboard (e.g., CTRL+UP ARROW or CTRL+DOWN Arrow)/voice/touchscreen command according to aspects of the embodiments. According to further aspects of the embodiments, the up/down toggling provided by arrows 704*a,b* and 702*a,b* can occur by one or more of keyboard commands, voice commands, touch commands, mouse pointer 710, among other interface operations. According to further aspects of the embodiments, additional text editor workspaces 308 can be added to the screen view of FIG. 4 as well (meaning that in a single screen workspace 308 multiple files/documents for generating content, or which have content in them, can be substantially simultaneously displayed, as is the case in FIG. 7).

As with the view illustrated in FIG. 5, the selected workspace 300*a,b* is indicated by the darker/more opaque background, and selection can occur through use of toggle left/right arrows 310*a,b*. Within workspace 300*a* there is first text editor workspace 308*a*1 and second text editor workspace 308*a*2, and in this case, as shown in FIG. 6, there are content containing files, from which a user may want to extract content to put into one or more of the documents within first and second text editor workspaces 308*b*1 and 308*b*2. Up and down toggling between first and second text editor workspaces 308*b*1 and 308*b*2 occurs through use of toggle up arrow 704*b* and toggle down arrow 702*b*, and the same can occur in first workspace 300*a* according to aspects of the embodiments. Still further, each respective workspace 300*a* is not limited to just two documents or files but can each include a plurality of such documents/files. Also shown in FIG. 7 is macro toolbar 706 (shown in the left side of the workspace view in FIG. 7, although the position is not limited thereto) and recommended workspace collection GUI (recommended workspace collection) 708 (shown in the bottom of the workspace view of FIG. 7, although the position is not limited thereto), the operation of both of which are discussed, respectively, in regard to FIGS. 8 and 9, below. Both of macro toolbar and recommended workspace collection can be activated, or opened, by moving mouse pointer 710 over the areas, or through one or more of voice commands, keyboard commands, or other means.

According to further aspects of the embodiments, in regard to FIG. 7, and the other Figures described herein, a user can edit text or create essays in either or both of workspaces 300*a,b* and text editor workspaces 308*a*1, 308*a*2. That is, both of workspaces 308*a*1, 308*a*2 can be file viewing areas, both can be text editing area, or the left side can be text editing and the right side can be file viewing, and the right side can be text editing and the left side can be file viewing.

According to further aspects of the embodiments, users can use a feature referred to as "loosely linking" sections of text between two documents, especially when copying and pasting sections between them. When a user makes a loose link between two documents, the name of the source document will appear as selected text is highlighted or hovered over with mouse pointer 710. The feature of "loosely linking" can occur automatically, i.e., whenever text (or other content) is imported from a first document to a second, or it can be done on a case-by-case basis, through the use of a button on a toolbar. Loose linking can be activated by one or more of a voice command, keyboard command, and touch commands. According to further aspects of the embodiments, the feature of loosely linking is not limited to just text, but any content that is imported or copied into an essay/text document e.g., a photo, weblink, among other types content. According to further aspects of the embodiments the user has the option to view a curtailed preview of the source when hovering over the text, e.g., just a title, as opposed to citation information. By way of a non-limiting example if a user creates a research paper, and imports some statistics from a published paper, when the user selected the statistics, and/or hovers over them the loosely linking feature can automatically show the name of the document, the author, page and/or paragraph number, date and so on, or just the title, according to aspects of the embodiments. According to further aspects of the embodiments, another feature of loosely linking is the ability of essay generating App 104/110 to bring up the source document and display the page/paragraph from which the reference information was taken from. Once the section is unselected or the user moves on, the loose link disappears. The feature of loosely linking is shown in FIG. 7; the original text/content came from text editor workspace 308*a*1 and was copied into text editor 308*a*2; pointer 710 is hovering over the text, and the citation information is shown in a box just below pointer 710.

According to further aspects of the embodiments, essay generating App 104/110 provides the user with the ability to "mark-up" or annotate any file or workspaces 308 featuring multiple documents. The mark-up mode or feature can be activated by one or more of a voice command, keyboard command, and touch commands. According to aspects of the embodiments, the mark-up mode can allow a user to use a finger (with touch screens) to add comments/annotations to a document/file, or through typing, a stylus or voice-to-print using voice recognition technology to leave notes on or in a document or workspace. By way of a non-limiting example, a student can provide one or more essay word documents to a teacher and then the teacher can "mark-up" using the mark-up mode while not directly changing the content.

Figure 8:
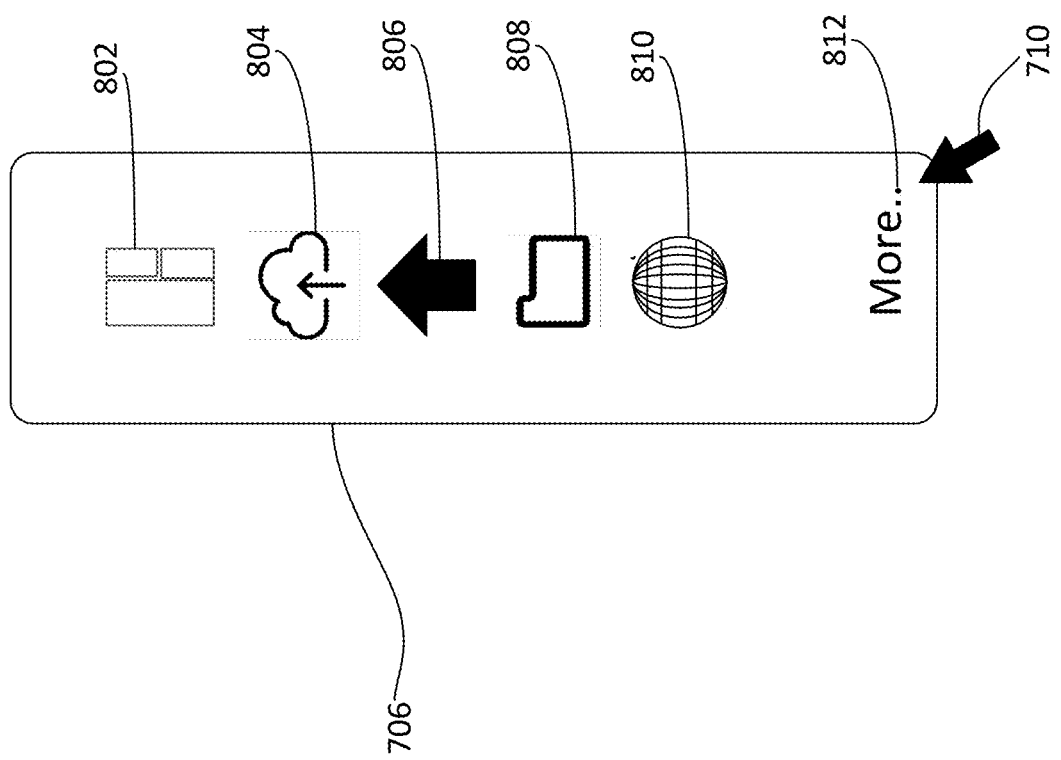
FIG. 8 illustrates an exploded view of a macro toolbar as shown in FIG. 7 with numerous functional features that can be used within any of the graphical user interface described and disclosed herein when operating the essay generating software application in a computing network environment according to aspects of the embodiments.

FIG. 8 illustrates an exploded view of macro toolbar 706 as shown in FIG. 7 with numerous functional features that can be used within any of the graphical user interface described and disclosed herein when operating the essay generating software application in computing network environment 100 according to aspects of the embodiments.

Macro toolbar 706 can be expanded and accessed on the left side of any view of workspaces 300. It includes several functions, including view layout configuration and modification button 802, upload document button 804, select and drag button 806, open expanded workspace collection button 808, open interactive spherical representative collection button 810, and additional functions and features button 812 according to aspects of the embodiments. In use, view layout configuration and modification button 802 allows the user to configure and change the view of the current workspace environment. Upload document button 804 provides the user with the ability to upload and drag files/documents (of various types) into the stack of a workplace (as shown in FIG. 7). Select and drag button 806 provides the user with the ability to select and drag a file between workspaces 300*a,b*, duplicate a file from one workspace 300 to another, or merge two or more workspaces. Open expanded workspace collection button 808 brings the user to an expanded workspace collection view, which is shown and discussed below in regard to FIG. 10. Open interactive spherical representative collection button 810 brings the user to the interactive spherical navigation and representation of expanded user workspace collection view, which is shown and discussed below in regard to FIG. 11. When a user selects or clicks on additional functions and features button 812, additional functions and features related to the manipulation of files and their content can become available according to aspects of the embodiments.

Figure 9:
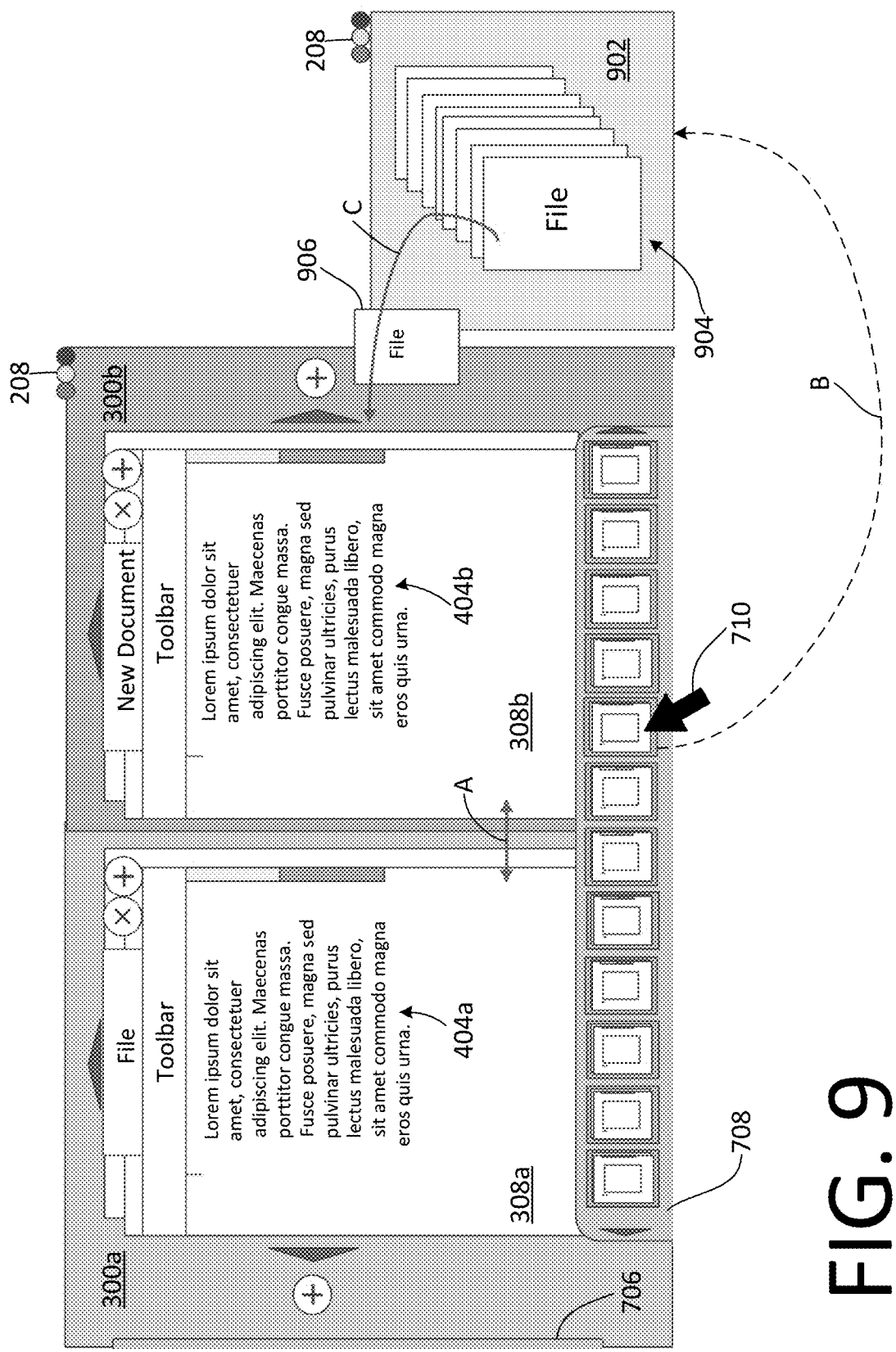
FIG. 9 illustrates a split screen view similar to that of FIG. 7, with the addition of a recommended workspace collection graphical user interface, wherein one or more additional workspace collections can be displayed and each of the recommended workspace collections contain one or more files and/or documents related to the content of either or both of files previously selected based on their content and content entered into one or more new documents generated by the user in the new document workspace when operating the essay generating software application in a computing network environment according to aspects of the embodiments.

FIG. 9 illustrates a split screen view similar to that of FIG. 7, with the addition of recommended workspace collection 708, wherein one or more additional workspace 300 collections can be displayed and each of the recommended workspace 300 collections contain one or more files and/or documents related to the content of either or both of files previously selected based on their content and content entered into one or more new documents generated by the user in the new document workspace when operating the essay generating software application in computing network environment 100 according to aspects of the embodiments.

The contents of recommended workspace collection 708 are developed or generated by an algorithm (recommended workspace App algorithm) that is contained within essay generating App 104/110. That is, whenever a particular workspace 300*a* is opened or selected as the active workspace, recommended workspace App algorithm self-generates a list of other workspaces 300 that contain related material or content, which can include text documents, all of the other file types discussed above, documents with photos, still images, links to webpages/websites, and virtually any content that is stored and accessible by essay generating App 104/110 according to aspects of the embodiments.

Recommended workspace collection 708 is typically hidden, or minimized, at the bottom of the workspace window environment on the display that is associated with the PED 102 in use by the user of essay generating App 104/110 according to aspects of the embodiments (although that position is not meant to be taken in a limiting manner). When a user rolls-over recommended workspace collection 708 with mouse pointer 710 (or selected by a keyboard/voice/touch-screen command, such as by arrow keys/Enter), recommended workspace collection 708 automatically expands (the view in FIG. 9 is relatively to scale and illustrates a "maximization" of recommended workspace collection 708) such that one or more related workspaces 300*x* are presented to the user as files in selected workspace collection 904 (collectively referred to, from here on in as "files 904") in files in selected workspace collection window 902 according to aspects of the embodiments (and as indicated by dotted arrow B). If the user determines that any one or more of the files 904 are usable, the user can click and drag the one or more files, the selected file referred to as selected file from selected workspace collection 906 (referred to as "selected file 906" from here on in), and, as arrow C indicates, selected file 906 can be imported or transferred to text editor workspace 308*b*, which is located in active workspace 300*b*.

Figure 10:
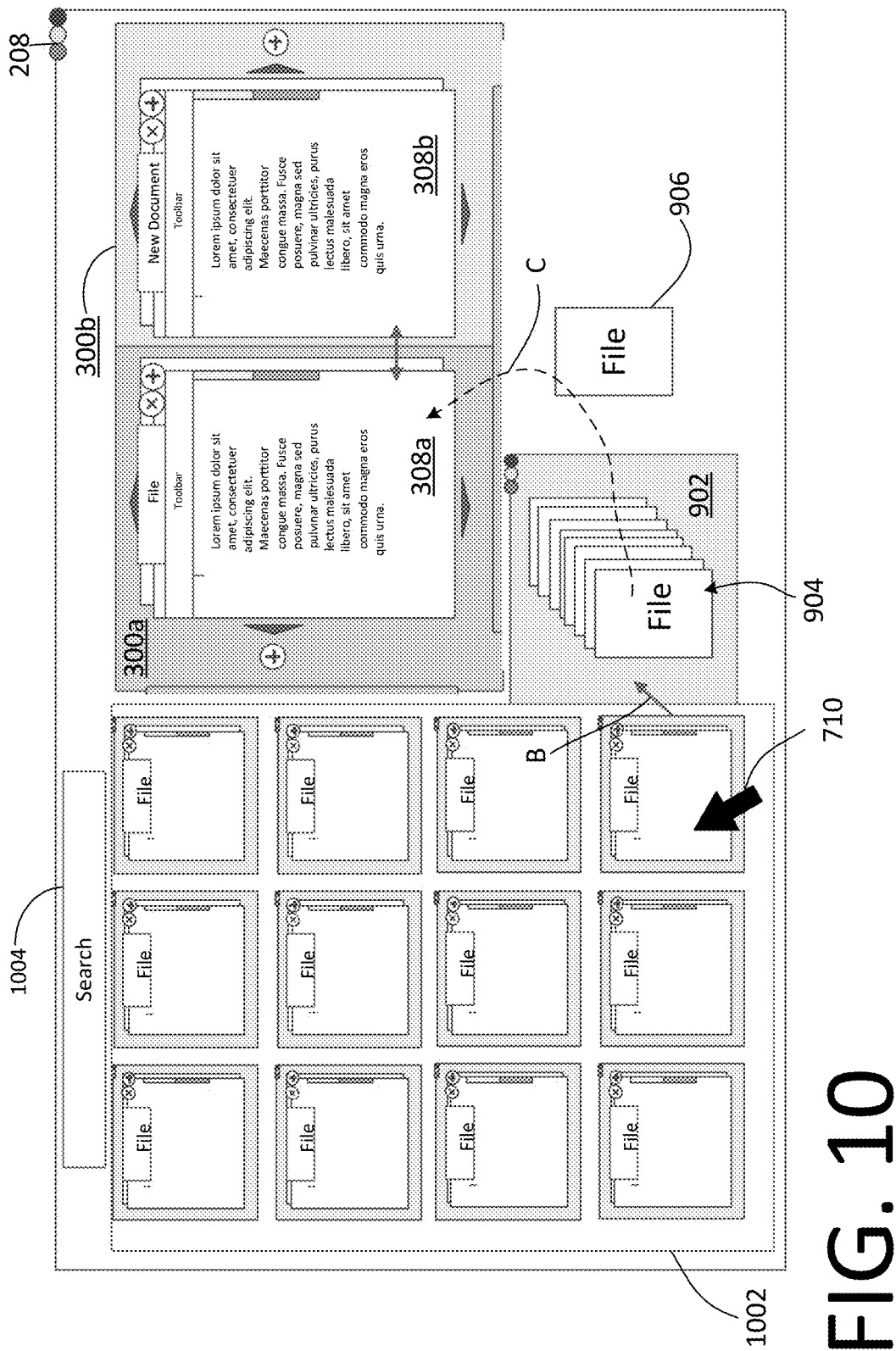
FIG. 10 illustrates an expanded view graphical use interface that occurs when accessing an expanded view graphical user interface button that is part of the macro toolbar shown in FIG. 9, and wherein upon clicking the expanded view interface button the essay generating software application displays, in a separate graphical user interface window, all of the previously generated and stored workspaces, such that the user can click on one and view the contents of the selected workspace in an expanded view when operating the essay generating software application in a computing network environment according to aspects of the embodiments.

FIG. 10 illustrates an expanded view graphical use interface that occurs when a user clicks-on or selects open expanded workspace collection button 808 that is part of macro toolbar 706 shown in FIGS. 7-9, When the user clicks on or selects open expanded workspace collection button 808 essay generating App 104/110 displays, in a separate graphical user interface window, all of the previously generated and stored workspaces 300, such that the user can click on one and view the contents of the selected workspace in an expanded view when operating essay generating App 104/110 in computing network environment 100 according to aspects of the embodiments.

There are several similarities between the operations represented by FIGS. 9 and 10, and therefore, in fulfillment of the dual purposes of clarity and brevity, similar operations/outcomes have been delineated with the same element numbers (e.g., elements 902, 904, arrows B, C, among others).

FIG. 10 represents or illustrates what is displayed on the monitor of PED 102 when a user has clicked or selected open expanded workspace collection button 808 as shown in FIG. 8 according to aspects of the embodiments. As opposed to the outcome of clicking on or selecting recommended workspace collection 708, when the user clicks or selects open expanded workspace collection button 808, all of the workspaces 300 are shown, according to a predetermined order, but with no "intelligence" in the workspaces selections—meaning, all of the already established workspaces are shown. There is no algorithm in determining any sort of relevance in regard to what is displayed, other than a retrieval of all of the previously generated workspaces 300. The entirety of the workspaces 300 collection is then viewed in expanded workspace view window 1002.

As discussed above in regard to FIG. 9, workspaces 300 displayed in expanded workspace view window 1002 contain material or content that can include text documents, and all of the other file types discussed above that can include documents with photos, still images, links to webpages/websites, and virtually any content that is stored and accessible by essay generating App 104/110 according to aspects of the embodiments.

Upon opening of expanded workspace view window 1002, a user can point to, or roll-over a particular workspace 300 with mouse pointer 710 (or selected by a keyboard/voice/touch-screen command, such as by arrow keys/Enter) such that one of the workspaces 300 are presented to the user as files 904 in selected workspace collection window 902 according to aspects of the embodiments (and as indicated by arrow B). If the user determines that any one or more of the files 904 are usable, the user can click and drag one or more files to text editor workspace 308*a* (as indicated by arrow C), wherein the selected file is referred to as selected file 906. According to further aspects of the embodiments, the user can select a file in expanded workspace view window 1002 by one or more of keyboard commands, voice commands, touch commands, mouse pointer 710, among other interface operations.

According to further aspects of the embodiments, the user has the option to further sort or filter workspaces 300 that have been displayed in expanded workspace view window 1002. That is, a search function has been provided, shown in FIG. 10 as search box 1004. In a manner known to those of skill in the art, one or more terms can be entered into search box, and a search algorithm that is a component of essay generating App 104/110 can filter all of workspaces 300 for relevant ones and then re-display only the selected workspaces 300 in expanded view expanded workspace view window 1002. The user can repeat the process to research just the most recently found workspaces 300 or can choose to select new terms to select the entire workspace 300 according to further aspects of the embodiments. Still further, advanced searching methodologies can be employed, such as Boolean logic searched, truncation (both anterior and posterior), "wildcard" searching (a search for a word with a letter indicated by a character to indicate all variations), nesting, phrase searching, among many other searching methodologies, as known to those of skill in the art.

According to further aspects of the embodiments, all or substantially all of the functions and features described above in regard to FIG. 10 and use of open expanded workspace collection button 808 can occur through use of the ESC key on the user's keyboard or touchscreen. One or more scroll bars (vertically, horizontally) can also be used. According to further aspects of the embodiments, workspaces 300 can also include a "return to last" feature, wherein a command can be implemented (e.g., a voice command, or keyboard command such as CTRL+BACKSPACE), that will automatically return the user from an expanded view to the last used split screen view.

Figure 11:
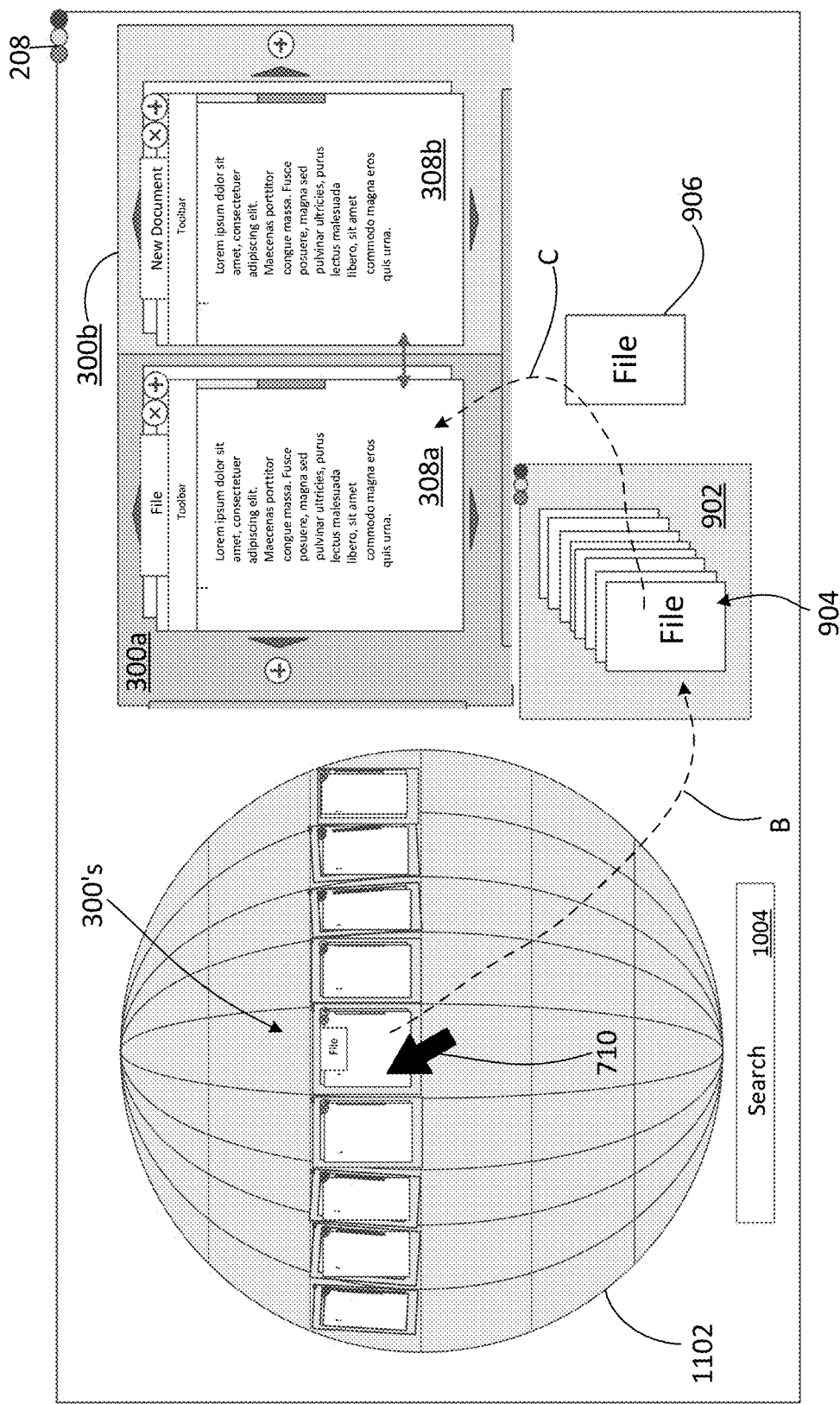
FIG. 11 illustrates an expanded spherical view graphical use interface that opens when accessing a spherical view graphical user interface button located in the macro toolbar shown in FIG. 9, and wherein upon clicking the spherical view interface button the essay generating software application displays, in a separate graphical user interface window, all of the previously generated and stored workspaces in the spherical view GUI, such that the user can click on one and view the contents of the selected workspace in an expanded view when operating the essay generating software application in a computing network environment according to aspects of the embodiments.

FIG. 11 illustrates expanded workspace spherical view window 1102 that opens when a user clicks on or selects open interactive spherical representative collection button 810 that is located in macro toolbar 76 shown in FIGS. 7 and 9. When a user clicks on or selects open interactive spherical representative collection button 810 essay generating App 104/110 displays, in a separate GUI window, all of the previously generated and stored workspaces 300 in expanded workspace spherical view window 1102, such that the user can click on (or select) one and view the contents of the selected workspace 300 in an expanded view when operating essay generating App 104/110 in computing network environment 100 according to aspects of the embodiments.

Expanded workspace spherical view window 1102 operates in a similar manner to that of expanded workspace view window 1002 in that all of the previously generated workspaces are initially displayed; however, expanded workspace spherical view window 1102 incorporates further features including the capability of rotating to display, in a predetermined order, all of the workspaces 300 previously created. That is, in the spherical GUI, the user can spin the sphere to the left or the right using one or more of keyboard commands, voice commands, touch commands, mouse pointer 710, among other interface operations. According to further aspects of the embodiments, each of the tiles shown in FIG. 11 in expanded workspace spherical view window 1102 can contain workspaces 300; in that case, the user can rotate expanded workspace spherical view window 1102 in virtually any direction: up, down, to the left and right, diagonally, using one or more of keyboard commands, voice commands, touch commands, mouse pointer 710, among other interface operations to get to any of the displayed workspaces 300. According to still further aspects of the embodiments, the user can also zoom in an out using one or more of keyboard commands, voice commands, touch commands, mouse pointer 710, among other interface operations. This can be particularly useful if there is a great number of workspaces 300, and the display may not have adequate resolution to make them all readable; using a zoom-in feature allows the user to see with particularity one or more workspaces 300 and make a decision as to whether or not to access that workspace 300. If the user were to zoom-out to a maximum zoom-out level, then expanded workspace spherical view window 1102 would show substantially only a single workspace 300, or portions of adjacent workspaces 300.

According to further aspects of the embodiments, expanded workspace spherical view window 1102 includes search box 1004 as described above in regard to FIG. 10 according to aspects of the embodiments. Expanded workspace spherical view window 1102 provides for substantially seamless search/access capabilities (e.g., via voice command) to limit time spent looking for necessary files/workspaces when developing content.

Similarly to expanded workspace view window 1002, a user can point to, or roll-over a particular workspace 300 located within expanded workspace spherical view window 1102 with mouse pointer 710 (or selected by a keyboard/voice/touch-screen command, such as by arrow keys/Enter) such that one of the workspaces 300 are presented to the user as files 904 in selected workspace collection window 902 according to aspects of the embodiments (and as indicated by arrow B). If the user determines that any one or more of the files 904 are usable, the user can click and drag one or more files to text editor workspace 308a (as indicated by arrow C), wherein the selected file is referred to as selected file 906.

According to further aspects of the embodiments, the user has the option to further sort or filter workspaces 300 that have been displayed in expanded workspace spherical view window 1102. That is, a search function has been provided, shown in FIG. 11 as search box 1004. In a manner known to those of skill in the art, one or more terms can be entered into search box, and a search algorithm that is a component of essay generating App 104/110 can filter all of workspaces 300 for relevant ones and then re-display only the selected workspaces 300 in expanded workspace spherical view window 1102. The user can repeat the process to research just the most recently found workspaces 300 or can choose to select new terms to select the entire workspace 300 according to further aspects of the embodiments. Still further, advanced searching methodologies can be employed, such as Boolean logic searched, truncation (both anterior and posterior), "wildcard" searching (a search for a word with a letter indicated by a character to indicate all variations), nesting, phrase searching, among many other searching methodologies, as known to those of skill in the art.

Figure 12:
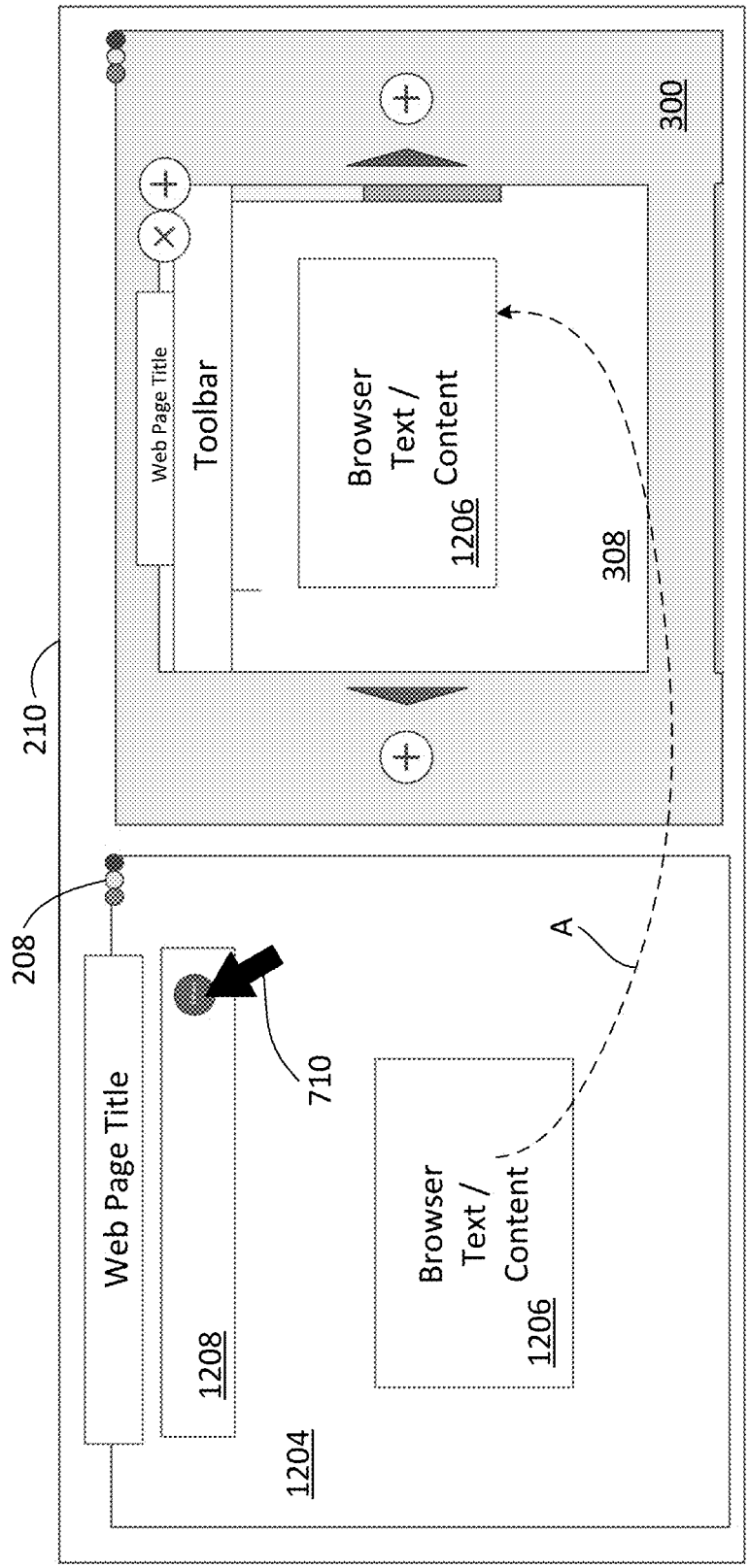
FIG. 12 illustrates a split screen GUI for generating content in a first workspace that is located in a first screen of the split screens, and wherein the second screen contains website or webpage content of a webpage that can be imported into the workspace and text editor workspace through use of a web-page clipper button that is a plug-in provided by the essay generating software application, wherein the web-page clipper button resides on the webpage toolbar of the webpage being viewed by the user when operating the essay generating application in a computing network environment according to aspects of the embodiments.

FIG. 12 illustrates a split screen GUI for generating content in a first workspace 300 that is located in a first screen of the split screens, and wherein the second screen contains website or webpage content 1206 of webpage 1204 that can be imported into workspace 300 and text editor workspace 308 through use of webpage clipper button 1202 that is a plug-in provided by essay generating App 104/110, wherein webpage clipper button 1202 resides on webpage toolbar 1208 of webpage 1204 being viewed by the user when operating essay generating App 104/110 in computing network environment 100 according to aspects of the embodiments.

Upon installation of essay generating App 104/110 onto PED 102, it can add webpage clipper button 1202 to one or more Internet browsers that the user has installed on the PED 102 being used. Webpage clipper button 1202 can be inserted onto webpage toolbar 1208; when a user opens a browser, and then finds a particular webpage 1204 for use with essay generating App 104/110, webpage clipper button 1202, when clicked or selected, transfers automatically to text editor workspace 308 all of the content that is present on that particular viewed webpage 1204 without having to "cut and paste" (the operation of which is shown as Arrow A in FIG. 12), according to aspects of the embodiments. The user can then edit webpage content 1206 as desired within text editor workspace 308. According to further aspects of the embodiments, the function provided by webpage clipper button 1202 and the importation of content/text into text editor workspace 308 as shown in regard to FIG. 12 can occur by one or more of keyboard commands, voice commands, touch commands, mouse pointer 710, among other interface operations.

According to further aspects of the embodiments, there are additional methods for importing content from webpages and/or other files/documents. One method is simply to click and drag the file/document/web-browser into a workspace 300. For example, if there were four webpages open in a web browser (e.g., Google Chrome), then by simply clicking on a first webpage and dragging it into workspace 300, four different workspaces 300(1)-(4) would be created, each with the content displayed in the webpage prior to clicking and dragging; a substantially similar action would occur if instead of a webpage, another file/document was displayed: the user could simply click and drag that content into a new workspace as well. In addition, an import button can be used in a workspace 300a that a user can select (through either a keyboard, voice, or mouse-pointer driven command) and important the contents of the desired file/document/webpage into one or more workspaces 300 according to aspects of the embodiments.

Figure 13:
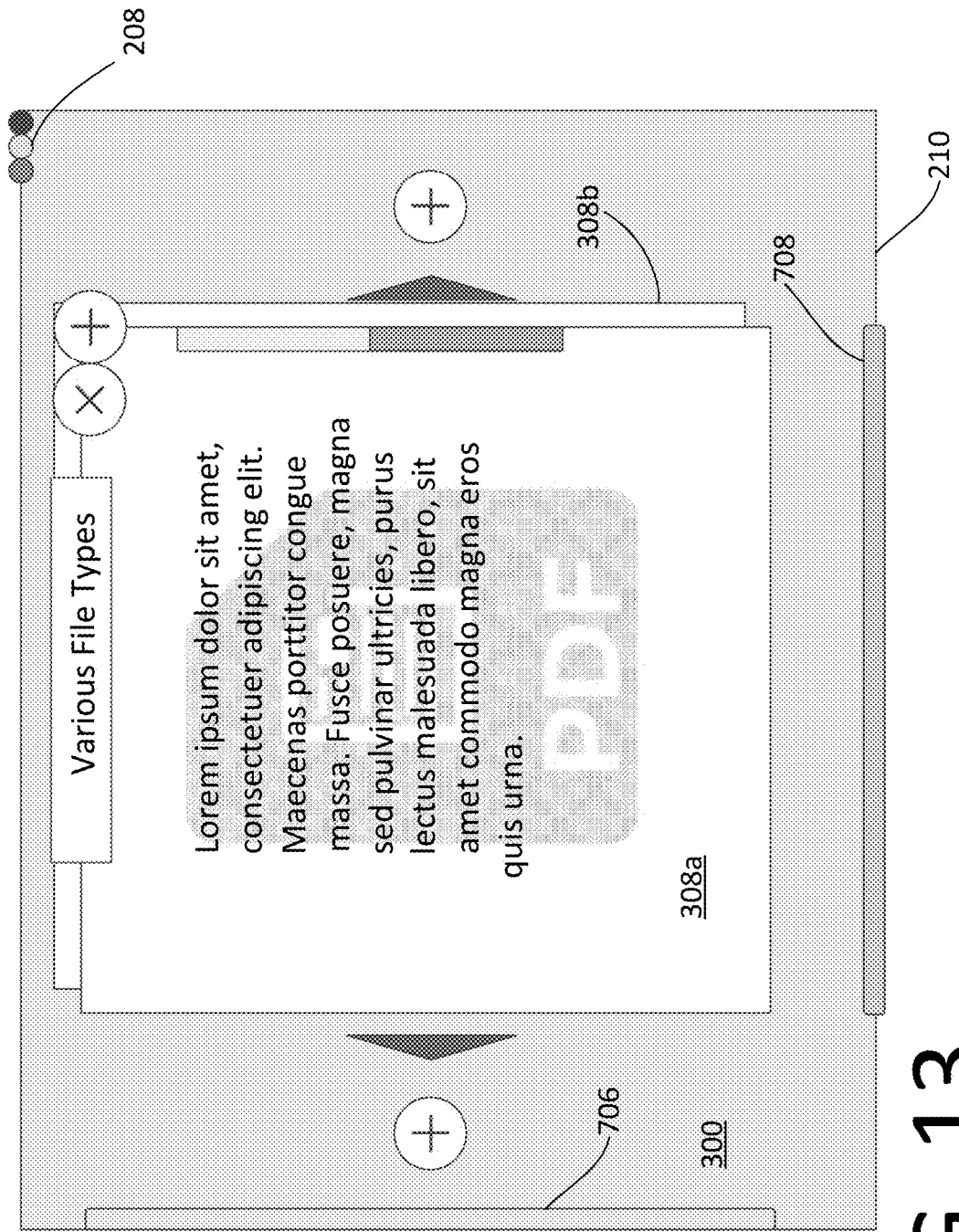
FIG. 13 illustrates a single screen graphical user interface in which a user, when viewing content of a file or document among a plurality of open files or documents, can use an overlay view feature such that a transparency setting of an uppermost file or document changes from opaque (such that only the file/document on top can be seen) to a different setting (transparent) such that content of a next document immediately below the uppermost document is simultaneously visible so that the user can continue to enter text/content into the first, uppermost document, while viewing the content of the next document when operating the essay generating software application in a computing network environment according to aspects of the embodiments.

FIG. 13 illustrates a single screen GUI (workspace 300) in which a user, when viewing content of a file or document among a plurality of open files or documents (e.g., a plurality of text editor workspaces 308a-n), can use an overlay view feature such that a transparency setting of an uppermost file or document changes from opaque (such that only the file/document on top can be seen) to a different setting (transparent) such that content of a next document immediately below the uppermost document is simultaneously visible so that the user can continue to enter text/content into the first, uppermost document, while viewing the content of the next document when operating essay generating App 104/110 in computing network environment 100 according to aspects of the embodiments.

Use of the overlay feature can facilitate the generation of a document because the user can see second text editor workspace 308b while entering content (typically through typing, though not necessarily) in first text editor workspace 308a according to aspects of the embodiments. Implementation of the overlay feature can occur through use of an interactive button, not shown, on macro toolbar 706, or through a voice command, or keyboard command, such as CTRL+SHIFT+ or CTRL+SHIFT-, wherein the "+" and "-" keys can alter the amount of transparency according to aspects of the embodiments.

Figure 14:
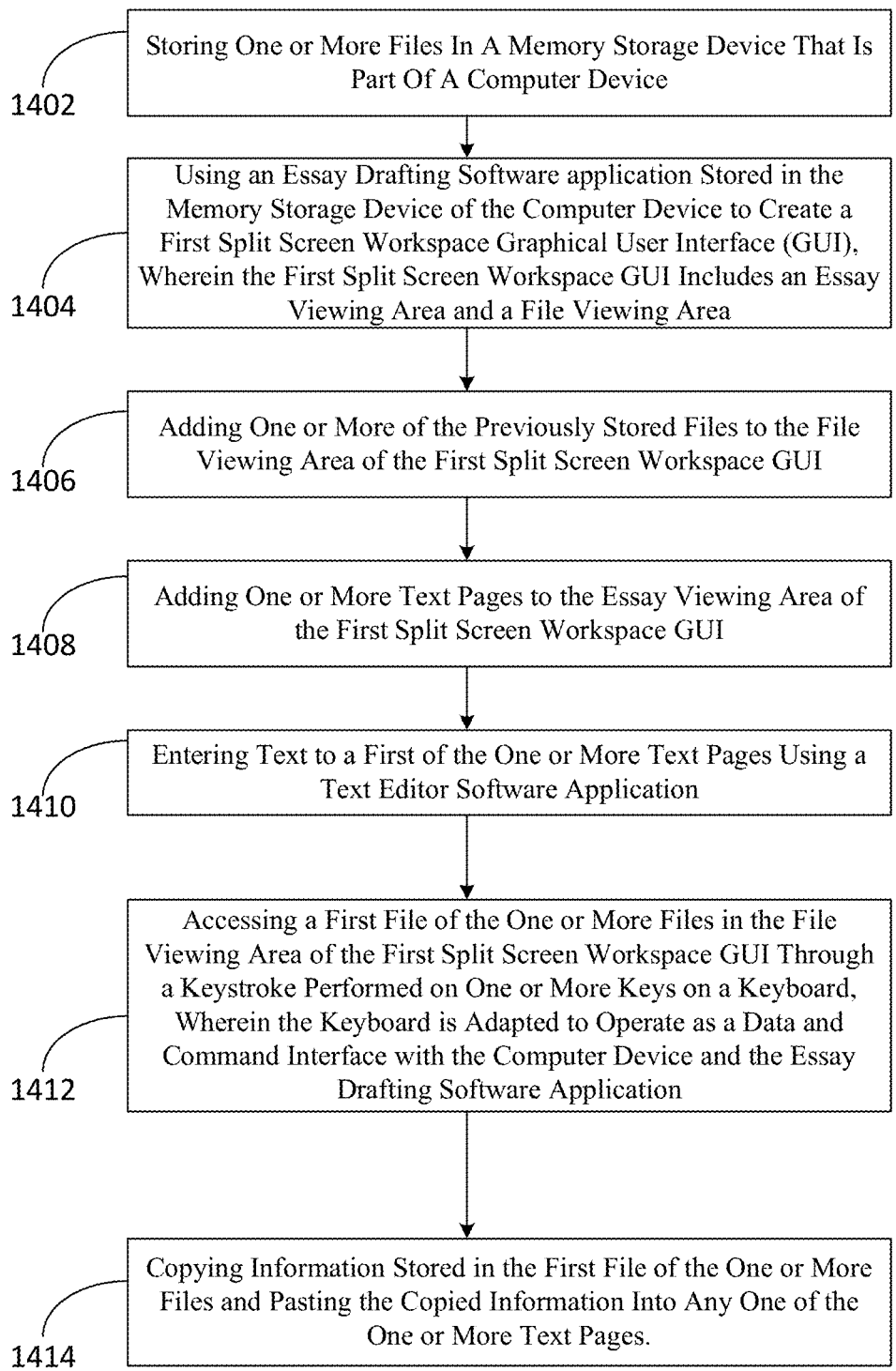
FIGS. 14, 15, and 16 each illustrate separate flow charts of a method for creating essays on a computer device using the essay generating software application on a computer device according to aspects of the embodiments.
Figure 15:
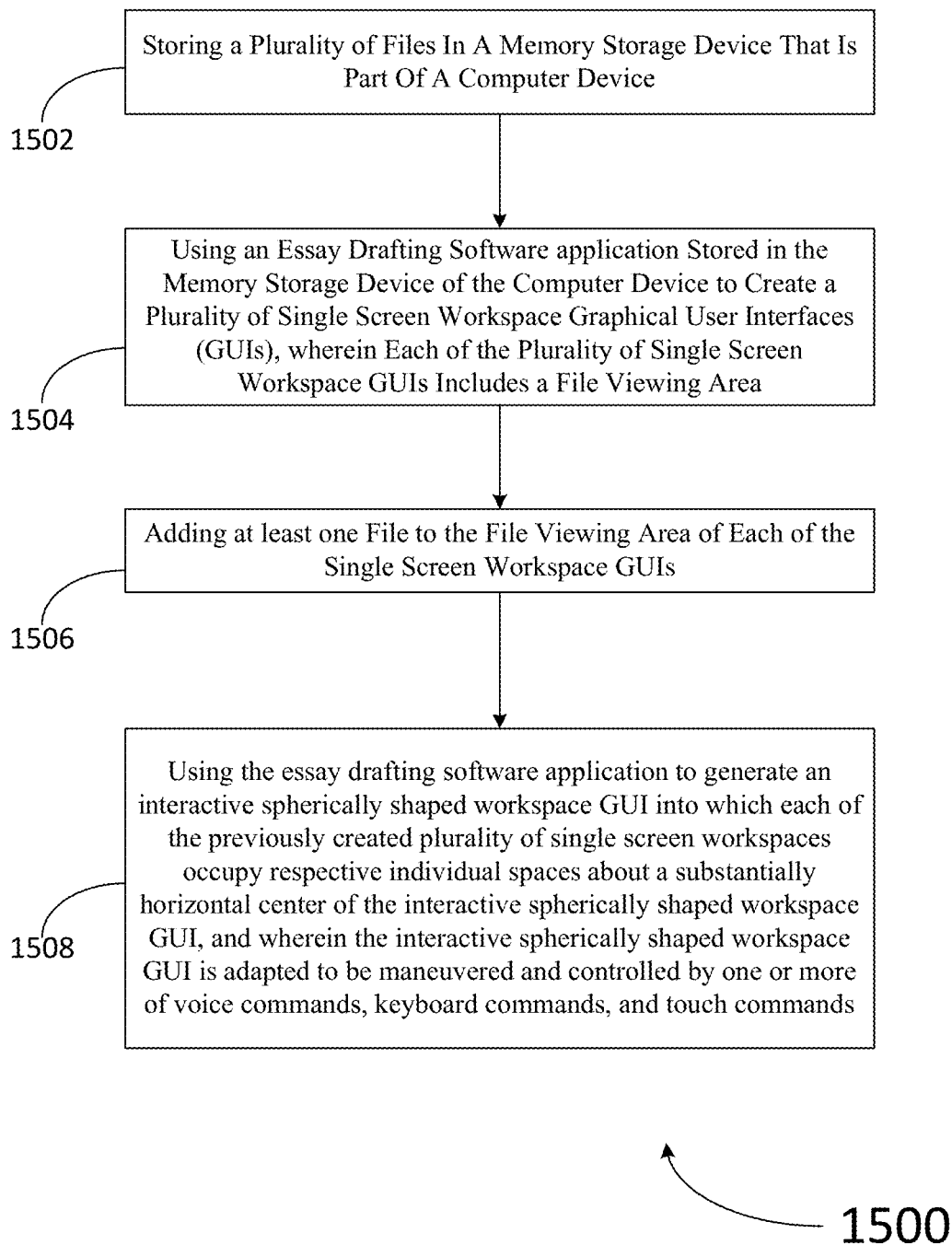
Figure 16:
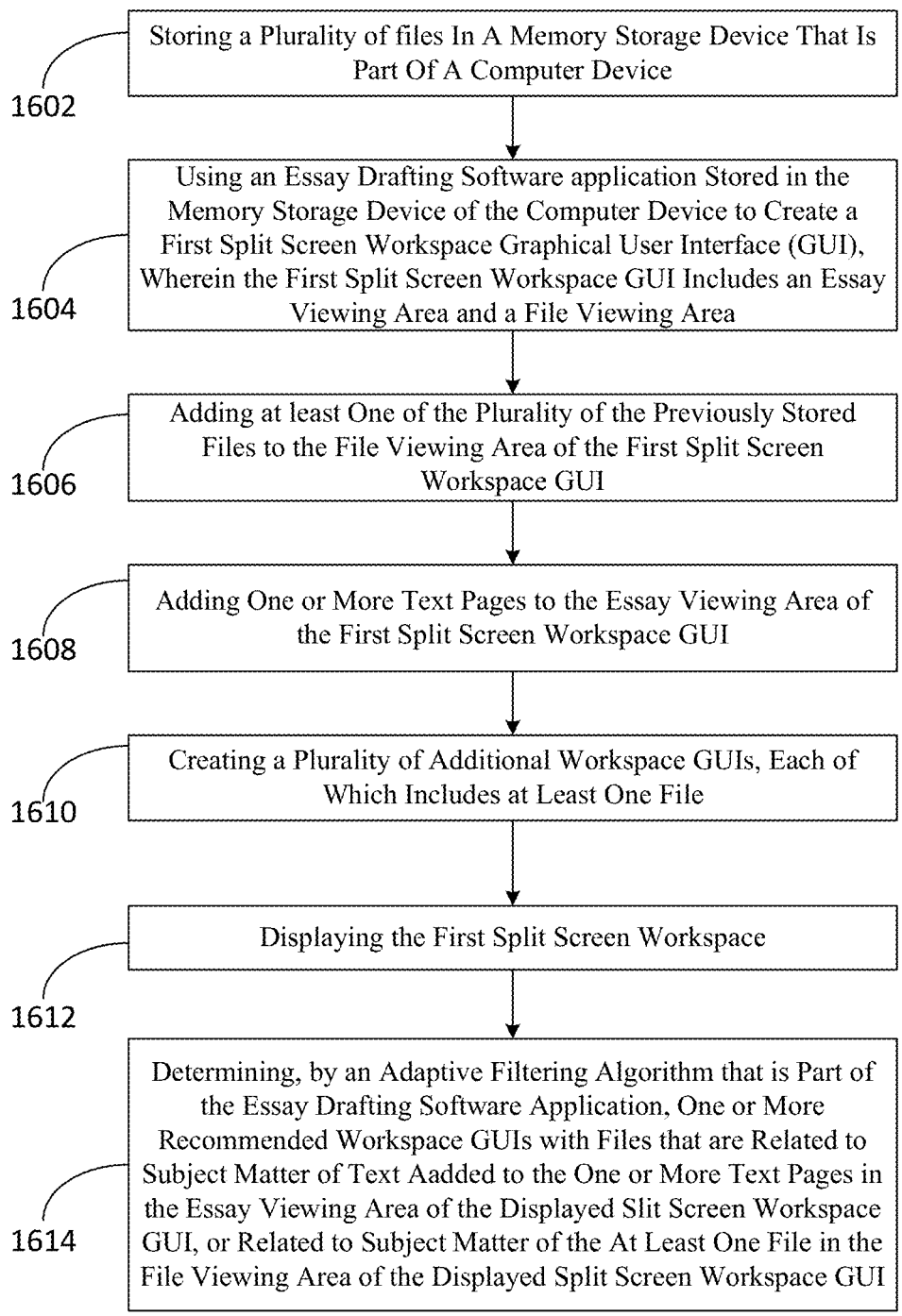

FIGS. 14, 15, and 16 each illustrate separate flow charts of methods 1400, 1500, and 1600, respectively, for creating essays on a computer device using essay generating App 104/110 on PED 102 according to aspects of the embodiments. According to aspects of the embodiments, the methods are not mutually exclusive—that is, substantially any portion of any of the methods illustrated in FIGS. 14-16 can be performed with each other; some steps can be omitted, many steps can be performed in any order, and many steps can be repeated, and repeated in virtually any order. The methods are shown in the manner herein merely to illustrate one or more aspects of the aspects of the embodiments and are not meant to be taken in a limiting manner, and therefore should not be taken in a limiting manner. According to further aspects of the embodiments, methods 1400, 1500, and 1600 do not enumerate all of the steps of the methods of creating essays on PED 102 using essay generating App 104/110 as described herein and shown in the accompanying Figures, but merely highlight some steps of the methods disclosed and described herein in order to make clear some, but not all of the aspects of the various aspects of the embodiments.

Attention is now directed to FIG. 14, and method 1400 for creating an essay using essay generating App 104/110 (or essay drafting software application) on a computing device (which can be embodied as PED 102) according to aspects of the embodiments. In method step 1402 the user stores on or more files in a memory storage device in the computing device. In method step 1404, the user uses essay generating App 104/110 that is stored in the memory storage device of the computing device to create a first split screen workspace graphical user interface (GUI), wherein the first split screen workspace GUI includes an essay viewing area and a file viewing area. In method step 1406 the user adds the one or more files to the file viewing area of the first split screen workspace GUI. In method step 1408 the user adds one or more text pages to the essay viewing area of the first split screen workspace GUI. In method step 1410 the user enters text to a first of the one or more text pages using a text editor software application. In method step 1412 accesses a first file of the one or more files in the file viewing area of the first split screen workspace GUI through a keystroke performed on one or more keys on a keyboard, wherein the keyboard is adapted to operate as a data and command interface with the computer device and the essay drafting software application, and in method step 1414, the user copies information stored in the first file of the one or more files and pasting the copied information into any one of the one or more text pages.

According to further aspects of the embodiments and method 1400, the step of accessing can be performed by one or more of voice commands or touch commands.

According to further aspects of the embodiments, method 1400 further comprises storing, in the memory storage device in PED 102, a plurality of files, creating, in the essay drafting software application, a plurality of single or split screen workspace graphical user interfaces GUIs, wherein each of the plurality of single or split screen workspace GUIs includes a file viewing area, adding at least one file to the file viewing area of each of the single or split screen workspace GUIs, and generating, by essay generating App 104/110, an interactive spherically shaped workspace graphical user interface (GUI), into which each of the previously created plurality of single or split screen workspace GUIs occupy respective individual spaces about a substantially horizontal center of the spherically shaped workspace GUI, and wherein the spherically shaped workspace GUI is adapted to be maneuvered and controlled by one or more of voice commands, keyboard commands, and touch commands.

According to further aspects of the embodiments, each of the one or more of voice commands, keyboard commands, and touch commands can operate to rotate the spherical representation to the left, rotate the spherical representation to the right, open a selected single screen workspace to make available for review its contents, and close the selected single screen workspace and return it to its location on the spherical representation.

Attention is now directed to FIG. 15, and method 1500 for creating an essay using essay generating App 104/110 (or essay drafting software application) on a computing device (which can be embodied as PED 102) according to aspects of the embodiments. In method step 1502 the user stores a plurality of files in a memory storage device in the computing device. In method step 1504, the user uses essay generating App 104/110 that is stored in the memory storage device of the computing device to create a plurality of single screen workspace graphical user interface (GUI), wherein each of the plurality of single screen workspaces GUIs includes a file viewing area. In method step 1506 the user adds at least one file to the file viewing area of the single screen workspace GUI. In method step 1508 the user generates an interactive spherically shaped workspace GUI using essay generating App 104/110, in which each of the previously created plurality of single screen workspaces occupy respective individual spaces about a substantially horizontal center of the interactive spherically shaped workspace GUI, and the interactive spherically shaped workspace GUI is adapted to be maneuvered and controlled by one or more of voice commands, keyboard commands, and touch commands.

According to further aspects of the embodiments and method 1500, each of the one or more of voice commands, keyboard commands, and touch commands can operate to rotate the interactive spherically shaped workspace GUI to the left, rotate the interactive spherically shaped workspace GUI to the right, open a selected single screen workspace to make available for review its contents, and close the selected single screen workspace and return it to its location on the interactive spherically shaped workspace GUI.

According to further aspects of the embodiments, method 1500 further comprises adding an essay viewing area to the single screen workspace GUI to make it a split screen workspace GUI with both an essay viewing area and a file viewing area.

According to further aspects of the embodiments, method 1500 further comprises adding one or more text pages to the essay viewing area of the first split screen workspace GUI.

According to further aspects of the embodiments, method 1500 further comprises entering text to a first of the one or more text pages of a first essay viewing area of a first split screen workspace GUI using a text editor software application, accessing a first file of the one or more files in the file viewing area of the first split screen workspace GUI through a keystroke performed on one or more keys on a keyboard, wherein the keyboard is adapted to operate as a data and command interface with the computer device and the essay drafting software application, and copying information stored in the first file of the one or more files and pasting the copied information into any one of the one or more text pages.

Attention is now directed to FIG. 16, and method 1600 for creating an essay using essay generating App 104/110 (or essay drafting software application) on a computing device (which can be embodied as PED 102) according to aspects of the embodiments. In method step 1602 the user stores a plurality of files in a memory storage device in the computing device.

In method step 1604, the user uses essay generating App 104/110 that is stored in the memory storage device of the computing device to create a first split screen workspace graphical user interface (GUI), wherein the first split screen workspace GUI includes an essay viewing area and a file viewing area.

In method step 1606 the user adds at least one of the plurality of files to the file viewing area of the split screen workspace GUI.

In method step 1608 the user adds one or more text pages to the essay viewing area of the first split screen workspace GUI.

In method step 1610, the user creates a plurality of additional workspace GUIs, each of which includes at least one file.

In method step 1612, the first split screen workspace is displayed, and in method step 1614, the essay drafting software application determines, using an adaptive filtering algorithm that is part of the essay drafting software application, one or more recommended workspace GUIs with files that are related to subject matter of text added to the one or more text pages in the essay viewing area of the displayed split screen workspace GUI, or related to subject matter of the at least one file in the file viewing area of the displayed split screen workspace GUI, according to aspects of the embodiments.

According to further aspects of the embodiments, method 1600 further comprises assembling and displaying in an interactive banner shaped GUI, through use of the adaptive filtering algorithm that is part of the essay drafting software application, the one or more recommended workspace GUIs, and wherein the interactive banner shaped GUI is adapted to be maneuvered and controlled by one or more of voice commands, keyboard commands, and touch commands.

According to further aspects of the embodiments, and method 1600, each of the one or more of voice commands, keyboard commands, and touch commands can operate to slide the interactive banner shaped GUI to the left, slide the interactive banner shaped GUI to the right, open a selected single screen workspace to make available for review its contents, and close the selected single screen workspace and return it to its location on the interactive banner shaped GUI.

According to further aspects of the embodiments, method 1600 further comprises adding an essay viewing area to the single screen workspace GUI to make it a split screen workspace GUI with both an essay viewing area and a file viewing area.

According to further aspects of the embodiments, method 1600 further comprises adding one or more text pages to the essay viewing area of the first split screen workspace GUI.

According to further aspects of the embodiments, method 1600 further comprises entering text to a first of the one or more text pages of a first essay viewing area of a first split screen workspace GUI using a text editor software application, accessing a first file of the one or more files in the file viewing area of the first split screen workspace GUI through a keystroke performed on one or more keys on a keyboard, wherein the keyboard is adapted to operate as a data and command interface with the computer device and the essay drafting software application, and copying information stored in the first file of the one or more files and pasting the copied information into any one of the one or more text pages.

Figure 17:
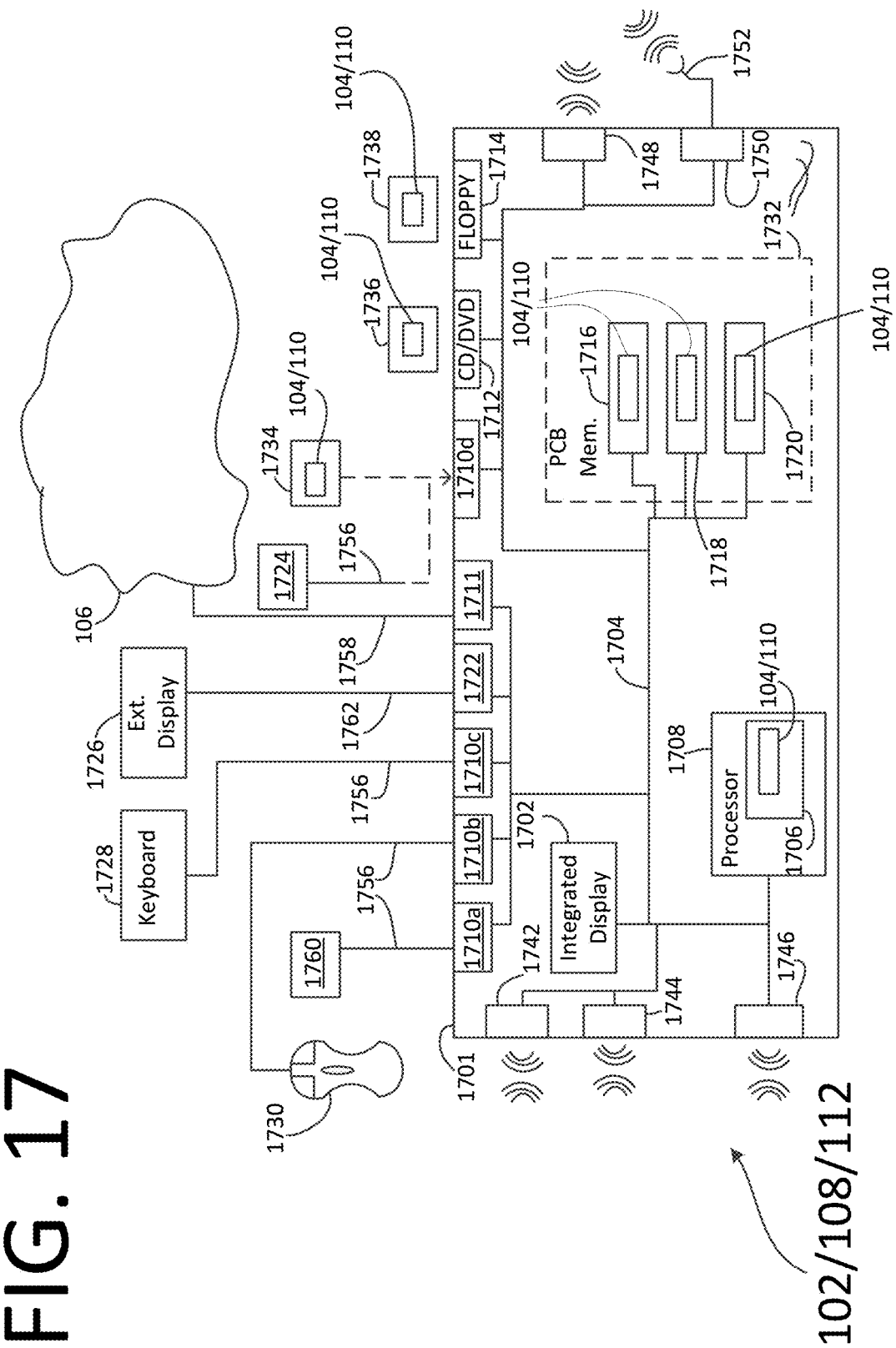
FIG. 17 illustrates a block diagram of the major components of a computer device, personal computer, server, laptop, and/or personal electronic device (herein after, "computer device") suitable for use to implement the methods shown in regard to FIGS. 14, 15, and 16, among others, for creating essays on a computer device using the essay generating software application according to aspects of the embodiments.

FIG. 17 illustrates a block diagram of the major components of a computer device, PC, server, laptop, and/or PED 102, 108, 112 (herein after, "computer device") suitable for use to implement methods 1400, 1500, and 1600, among others, for creating essays on a computer device, according to aspects of the embodiments. The computer device comprises, among other items, shell/box 1701, integrated display/touch-screen 1702 (though not used in every application of the computer device), internal data/command bus (bus) 1704, processor board/PC internal memory (internal memory) 1732, and one or more processors 1708 with processor internal memory 1706 (which can be typically read only memory (ROM) and/or random access memory (RAM)). Those of ordinary skill in the art can appreciate that in modern computer device systems, parallel processing is becoming increasingly prevalent, and whereas a single processor would have been used in the past to implement many or at least several functions, it is more common currently to have a single dedicated processor for certain functions (e.g., digital signal processors) and therefore could be several processors, acting in serial and/or parallel, as required by the specific application. The computer device further comprises multiple input/output ports, such as universal serial bus (USB) ports 1710, Ethernet ports 1711, and video graphics array (VGA) ports/high definition multimedia interface (HDMI) ports 1722, among other types. Further, the computer device includes externally accessible drives such as compact disk (CD)/digital versatile disk (DVD) read/write (RW) (CD/DVD/RW) drive 1712, and floppy diskette drive 1714 (though less used currently, some computer devices still include this type of interface). The computer device still further includes wireless communication apparatus, such as one or more of the following: Wi-Fi transceiver 1742, BlueTooth (BT) transceiver 1744, near field communications (NFC) transceiver 1746, third generation (3G)/fourth Generation (4G)/long term evolution (LTE)/fifth generation (5G) transceiver (cellular transceiver) 1748, communications satellite/global positioning system (satellite) transceiver 1750, and antenna 1752.

Internal memory 1732 itself can comprise hard disk drive (HDD) 1716 (these can include conventional magnetic storage media, but, as is becoming increasingly more prevalent, can include flash drive memory 1734, among other types), ROM 1718 (these can include electrically erasable programmable ROM (EEPROMs), ultra-violet erasable PROMs (UVPROMs), among other types), and RAM 1720. Usable USB port 1710 is flash drive memory 1734, and usable with CD/DVD/RW drive 1712 are CD/DVD diskettes (CD/DVD) 1736 (which can be both read and write-able). Usable with floppy diskette drive 1714 are floppy diskettes 1738. External memory storage device 1724 can be used to store data and programs external to box 1701 of the computer device, and can itself comprise another hard disk drive 1716a, flash drive memory 1734, among other types of memory storage. External memory storage device 1724 is connectable to the computer device via USB cable 1756. Each of the memory storage devices, or the memory storage media (1706, 1716, 1718, 1720, 1724, 1734, 1736, and 1738, among others), can contain parts or components, or in its entirety, executable software programming code or application that has been termed essay generating App 104/110 according to aspects of the embodiments, which can implement part or all of the portions of methods 1400, 1500, and 1600, among other methods not shown, described herein.

In addition to the above described components, the computer device also comprises keyboard 1728, external display 1726, printer/scanner/fax machine 1760, and mouse 1730 (although not technically part of the computer device, the peripheral components as shown in FIGS. 17 (1724, 1726, 1728, 1730, 1734, 1736, 1738, 1756, 1758, 1760, and 1762) are well known and adapted for use with the computer device that for purposes of this discussion they shall be considered as being part of the computer device). Other cable types that can be used with the computer device include RS 232, among others, not shown, that can be used for one or more of the connections between the computer device and the peripheral components described herein. Keyboard 1728, and mouse 1730 are connectable to the computer device via USB cable 56, and external display 1726 is connectible to the computer device via VGA cable/HDMI cable 1762. The computer device is connectible to network 106 via Ethernet port 1711 and Ethernet cable 1758 via a router and modulator-demodulator (MODEM) and internet service provider, none of which are shown in FIG. 17. All of the immediately aforementioned components (1722, 1724, 1726, 1728, 1730, 1734, 1736, 1738, 1756, 1758, and 1760) are known to those of ordinary skill in the art, and this description includes all known and future variants of these types of devices.

External display 1726 can be any type of known display or presentation screen, such as liquid crystal displays (LCDs), light emitting diode displays (LEDs), plasma displays, cathode ray tubes (CRTs), among others (including touch screen displays). In addition to the user interface mechanism such as mouse 1730, the computer device can further include a microphone, touch pad, joy stick, touch screen, voice-recognition system, among other interactive inter-communicative devices/programs, which can be used to enter data and voice, and which all of are known to those of skill in the art and thus a detailed discussion thereof has been omitted in fulfillment of the dual purposes of clarity and brevity.

As mentioned above, the computer device further comprises a plurality of wireless transceiver devices, such as Wi-Fi transceiver 1742, BT transceiver 1744, NFC transceiver 1746, cellular transceiver 1748, satellite transceiver 1750, and antenna 1752. While each of Wi-Fi transceiver 1742, BT transceiver 1744, NFC transceiver 1746, cellular transceiver 1748, and satellite transceiver 1750 has their own specialized functions, each can also be used for other types of communications, such as accessing a cellular service provider (not shown), accessing network 106 (which can include the Internet), texting, emailing, among other types communications and data/voice transfers/exchanges, as known to those of skill in the art. Each of Wi-Fi transceiver 1742, BT transceiver 1744, NFC transceiver 1746, cellular transceiver 1748, satellite transceiver 1750 includes a transmitting and receiving device, and a specialized antenna, although in some instances, one antenna can be shared by one or more of Wi-Fi transceiver 1742, BT transceiver 1744, NFC transceiver 1746, cellular transceiver 1748, and satellite transceiver 1750. Alternatively, one or more of Wi-Fi transceiver 1742, BT transceiver 1744, NFC transceiver 1746, cellular transceiver 1748, and satellite transceiver 1750 will have a specialized antenna, such as satellite transceiver 1750 to which is electrically connected at least one antenna 1752.

In addition, the computer device can access network 106 (which can be the Internet), either through a hard wired connection such as Ethernet port 1711 as described above, or wirelessly via Wi-Fi transceiver 1742, cellular transceiver 1748 and/or satellite transceiver 1750 (and their respective antennas) according to aspects of the embodiments. The computer device can also be part of a larger network configuration as in a global area network (GAN) (e.g., internet), which ultimately allows connection to various landlines.

According to further aspects of the embodiments, integrated touch screen display 1702, keyboard 1728, mouse 1730, and external display 1726 (if in the form of a touch screen), can provide a means for a user to enter commands, data, digital, and analog information into the computer device. Integrated and external displays 1702, 1726 can be used to show visual representations of acquired data, and the status of applications that can be running, among other things.

Bus 1704 provides a data/command pathway for items such as: the transfer and storage of data/commands between processor 1708, Wi-Fi transceiver 1742, BT transceiver 1744, NFC transceiver 1746, cellular transceiver 1748, satellite transceiver 1750, integrated display 1702, USB port 1710, Ethernet port 1711, VGA/HDMI port 1722, CD/DVD/RW drive 1712, floppy diskette drive 1714, and internal memory 1732. Through bus 1704, data can be accessed that is stored in internal memory 1732. Processor 1708 can send information for visual display to either or both of integrated and external displays 1702, 1726, and the user can send commands to the system operating essay generating App 104/110 that might reside in processor internal memory 1706 of processor 1708, or any of the other memory devices (1736, 1738, 1716, 1718, and 1720).

The computer device, and either processor internal memory 1706 or internal memory 1732, can be used to implement one or more, or any combination thereof, methods 1400, 1500, and 1600, as well as those not shown and discussed, for creating essays using a computer device according to aspects of the embodiments. Hardware, firmware, software or a combination thereof can be used to perform the various steps and operations described herein. According to aspects of the embodiments, essay generating App 104/110 for carrying out the above discussed steps can be stored and distributed on multi-media storage devices such as devices 1716, 1718, 1720, 1734, 1736 and/or 1738 (described above) or other form of media capable of portably storing information. Storage media 1734, 1736 and/or 1738 can be inserted into, and read by devices such as USB port 1710, CD/DVD/RW drive 1712, and floppy disk drive 1714, respectively.

As also will be appreciated by one skilled in the art, the various functional aspects of the aspects of the embodiments can be embodied in a wireless communication device, a telecommunication network, or as a method or in a computer program product. Accordingly, aspects of embodiments can take the form of an entirely hardware embodiment or an embodiment combining hardware and software aspects. Further, the aspects of embodiments can take the form of a computer program product stored on a computer-readable storage medium having computer-readable instructions embodied in the medium. Any suitable computer-readable medium can be utilized, including hard disks, CD-ROMs, DVDs, optical storage devices, or magnetic storage devices such a floppy disk or magnetic tape. Other non-limiting examples of computer-readable media include flash-type memories or other known types of memories.

Further, those of ordinary skill in the art in the field of the aspects of the embodiments can appreciate that such functionality can be designed into various types of circuitry, including, but not limited to field programmable gate array structures (FPGAs), application specific integrated circuitry (ASICs), microprocessor based systems, among other types. A detailed discussion of the various types of physical circuit implementations does not substantively aid in an understanding of the aspects of the embodiments, and as such has been omitted for the dual purposes of brevity and clarity. However, as well known to those of ordinary skill in the art, the systems and methods discussed herein can be implemented as discussed and can further include programmable devices.

Such programmable devices and/or other types of circuitry as previously discussed can include a processing unit, a system memory, and a system bus that couples various system components including the system memory to the processing unit. The system bus can be any of several types of bus structures including a memory bus or memory controller, a peripheral bus, and a local bus using any of a variety of bus architectures. Furthermore, various types of computer readable media can be used to store programmable instructions. Computer readable media can be any available media that can be accessed by the processing unit. By way of example, and not limitation, computer readable media can comprise computer storage media and communication media. Computer storage media includes volatile and non-volatile as well as removable and non-removable media implemented in any method or technology for storage of information such as computer readable instructions, data structures, program modules or other data. Computer storage media includes, but is not limited to, RAM, ROM, EEPROM, flash memory or other memory technology, CD-ROMs, DVDs or other optical disk storage, magnetic cassettes, magnetic tape, magnetic disk storage or other magnetic storage devices, or any other medium which can be used to store the desired information and which can be accessed by the processing unit. Communication media can embody computer readable instructions, data structures, program modules or other data in a modulated data signal such as a carrier wave or other transport mechanism and can include any suitable information delivery media.

The system memory can include computer storage media in the form of volatile and/or nonvolatile memory such as ROM and/or RAM. A basic input/output system (BIOS), containing the basic routines that help to transfer information between elements connected to and between the processor, such as during start-up, can be stored in memory. The memory can also contain data and/or program modules that are immediately accessible to and/or presently being operated on by the processing unit. By way of non-limiting example, the memory can also include an operating system, application programs, other program modules, and program data.

The processor can also include other removable/non-removable and volatile/nonvolatile computer storage media. For example, the processor can access a hard disk drive that reads from or writes to non-removable, nonvolatile magnetic media, a magnetic disk drive that reads from or writes to a removable, nonvolatile magnetic disk, and/or an optical disk drive that reads from or writes to a removable, nonvolatile optical disk, such as a CD-ROM or other optical media. Other removable/non-removable, volatile/nonvolatile computer storage media that can be used in the operating environment include, but are not limited to, magnetic tape cassettes, flash memory cards, digital versatile disks, digital video tape, solid state RAM, solid state ROM and the like. A hard disk drive can be connected to the system bus through a non-removable memory interface such as an interface, and a magnetic disk drive or optical disk drive can be connected to the system bus by a removable memory interface, such as an interface.

Aspects of the embodiments discussed herein can also be embodied as computer-readable codes on a computer-readable medium. The computer-readable medium can include a computer-readable recording medium and a computer-readable transmission medium. The computer-readable recording medium is any data storage device that can store data which can be thereafter read by a computer system. Examples of the computer-readable recording medium include ROM, RAM, CD-ROMs and generally optical data storage devices, magnetic tapes, flash drives, and floppy disks. The computer-readable recording medium can also be distributed over network coupled computer systems so that the computer-readable code is stored and executed in a distributed fashion. The computer-readable transmission medium can transmit carrier waves or signals (e.g., wired or wireless data transmission through the Internet). Also, functional programs, codes, and code segments to, when implemented in suitable electronic hardware, accomplish or support exercising certain elements of the appended claims can be readily construed by programmers skilled in the art to which the aspects of the embodiments pertains.

The disclosed aspects of the embodiments provide a system and method for generating essays on one or more computer devices. It should be understood that this description is not intended to limit aspects of the embodiments. On the contrary, aspects of the embodiments are intended to cover alternatives, modifications, and equivalents, which are included in the spirit and scope of the aspects of the embodiments as defined by the appended claims. Further, in the detailed description of the aspects of the embodiments, numerous specific details are set forth to provide a comprehensive understanding of the claimed aspects of the embodiments. However, one skilled in the art would understand that various aspects of the embodiments can be practiced without such specific details.

Figure 18:
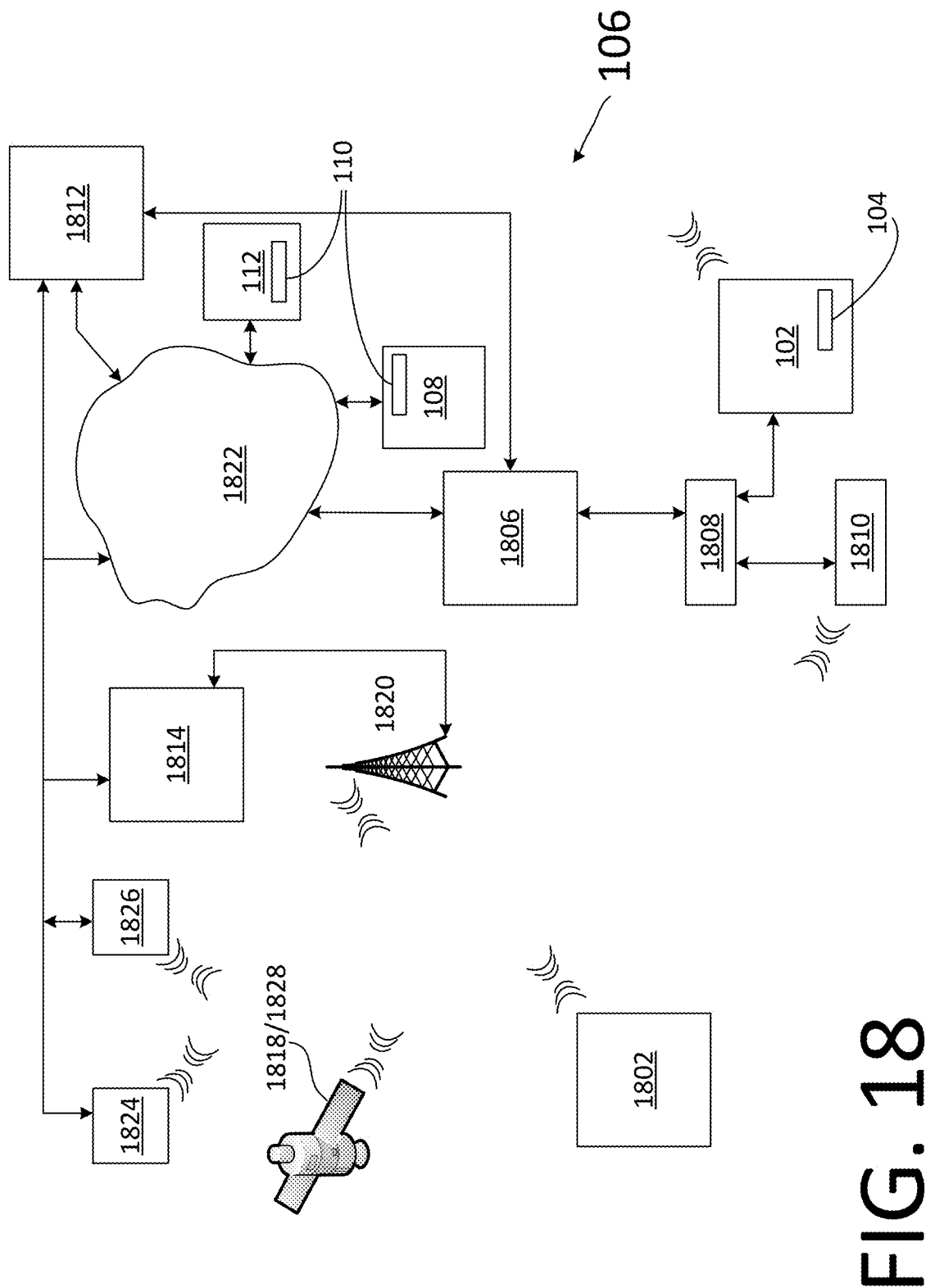
FIG. 18 illustrates network system 1800 within which the system and method for creating essays on a computer device can be implemented using the essay generating software application according to aspects of the embodiments.

FIG. 18 illustrates network system 1800 within which the system and method for creating essays on a computer device can be implemented according to aspects of the embodiments. Much of the infrastructure of network system 1800 shown in FIG. 18 is or should be known to those of skill in the art, so, in fulfillment of the dual purposes of clarity and brevity, a detailed discussion thereof shall be omitted.

According to aspects of the embodiments, a user of the above described system and method can store PED essay App 104 on their mobile device 1802, as well as PED 102. Mobile devices 1802 can include, but are not limited to, so-called smart phones, tablets, personal digital assistants (PDAs), notebook and laptop computers, and essentially any device that can access the internet and/or cellular phone service or can facilitate transfer of the same type of data in either a wired or wireless manner.

Both mobile device 1802 and PED 102 can access cellular service provider 1814, either through a wireless connection (cellular tower 1820) or via a wireless/wired interconnection (a "Wi-Fi" system that comprises, e.g., modulator/demodulator (modem) 1808, wireless router 1810, internet service provider (ISP) 1806, and internet 1822). Further, mobile device 1802 and PED 102 can include NFC, "Wi-Fi," and Bluetooth (BT) communications capabilities as well, all of which are known to those of skill in the art. To that end, network system 106 further includes, as many homes (and businesses) do, one or more PEDs 102 that can be connected to wireless router 1810 via a wired connection (e.g., modem 1808) or via a wireless connection (e.g., Bluetooth). Modem 1808 can be connected to ISP 1806 to provide internet-based communications in the appropriate format to end users (e.g., PED 102), and which takes signals from the end users and forwards them to ISP 1806. Such communication pathways are well known and understand by those of skill in the art, and a further detailed discussion thereof is therefore unnecessary.

Mobile device 1802 and PEDs 102 can also access global positioning system (GPS) satellite 1828, which is controlled by GPS station 1824, to obtain positioning information (which can be useful for different aspects of the embodiments), or mobile device 1802 and PEDs 102 can obtain positioning information via cellular service provider 1814 using cellular 1822 tower(s) 1820 according to one or more well-known methods of position determination. Some mobile devices 1802 can also access communication satellites 1818 and their respective satellite communication systems control stations 1826 (the satellite in FIG. 18 is shown common to both communications and GPS functions) for near-universal communications capabilities, albeit at a much higher cost than convention "terrestrial" cellular services. Mobile device 1802 can also obtain positioning information when near or internal to a building (or arena/stadium) through the use of one or more of NFC/BT devices, the details of which are known to those of skill in the art. FIG. 18 also illustrates other components of network 106 such as plain old telephone service (POTS) provider 1812.

According to further aspects of the embodiments, and as described above, network 106 also contains servers 108, 112 that can include Server essay App 110, wherein one or more processors, using known and understood technology, such as memory, data and instruction buses, and other electronic devices, can store and implement code that can implement the system and method for creating essays on a computer device according to aspects of the embodiments.

As described above, an encoding process is discussed specifically in reference to FIGS. 14-16, although such delineation is not meant to be, and should not be taken in a limiting manner, as additional methods according to aspects of the embodiments have been described herein. The encoding processes as described are not meant to limit the aspects of the embodiments, or to suggest that the aspects of the embodiments should be implemented following the encoding processes. The purpose of the encoding processes as described is to facilitate the understanding of one or more aspects of the embodiments and to provide the reader with one or many possible implementations of the processed discussed herein. FIGS. 14-16 illustrates a flowchart of various steps performed during the encoding process, but such encoding processes are not limited thereto. The steps of FIGS. 14-16 are not intended to completely describe the encoding processes but only to illustrate some of the aspects discussed above.

This application may contain material that is subject to copyright, mask work, and/or other intellectual property protection. The respective owners of such intellectual property have no objection to the facsimile reproduction of the disclosure by anyone as it appears in published Patent Office file/records, but otherwise reserve all rights.

The disclosed embodiments provide a system, software, and a method for creating or generating one or more essays on a computer device. It should be understood that this description is not intended to limit the embodiments. On the contrary, the embodiments are intended to cover alternatives, modifications, and equivalents, which are included in the spirit and scope of the embodiments as defined by the appended claims. Further, in the detailed description of the embodiments, numerous specific details are set forth to provide a comprehensive understanding of the claimed embodiments. However, one skilled in the art would understand that various embodiments may be practiced without such specific details.

Although the features and elements of aspects of the embodiments are described being in particular combinations, each feature or element can be used alone, without the other features and elements of the embodiments, or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

The above-described embodiments are intended to be illustrative in all respects, rather than restrictive, of the embodiments. Thus, the embodiments are capable of many variations in detailed implementation that can be derived from the description contained herein by a person skilled in the art. No element, act, or instruction used in the description of the present application should be construed as critical or essential to the embodiments unless explicitly described as such. Also, as used herein, the article "a" is intended to include one or more items.

All United States patents and applications, foreign patents, and publications discussed above are hereby incorporated herein by reference in their entireties.

INDUSTRIAL APPLICABILITY

To solve the aforementioned problems, the aspects of the embodiments are directed towards systems, methods, and modes for a computer-based dynamic content generation application that facilitates document creation through the substantially seamless synthesis of information from multiple reference files and file types to edit text/content within one integrated space.

ALTERNATE EMBODIMENTS

Alternate embodiments may be devised without departing from the spirit or the scope of the different aspects of the embodiments.

What is claimed is:

1. A computer implemented method of creating creative content on a computer device, comprising:
   storing, in a memory storage device in the computer device, a plurality of files;
   creating, in a content creation software application, a plurality of split screen workspace graphical user interfaces (GUIs), wherein each of the plurality of the split screen workspace GUIs includes a content viewing environment and a file viewing environment, wherein the content viewing environment and the file viewing environment are arranged horizontally side-by-side with respect to one another in each of the split screen workspace GUIs;
   generating, by the content creation software application, an interactive spherically shaped workspace graphical user interface (GUI), into which each of the previously created plurality of split screen workspace GUIs occupy respective individual spaces about a horizontal center of the spherically shaped workspace GUI, and wherein the spherically shaped workspace GUI is adapted to be maneuvered and controlled by one or more of voice commands, keyboard commands, and touch commands, wherein the spherically shaped workspace graphical user interface (GUI) comprises a grid with cells and wherein the cells contain collections of files;
   adding at least one of the plurality of files to the file viewing environment of the split screen workspace GUIs;
   adding one or more text pages to the content viewing environment of the split screen workspace GUIs;
   entering text to a first of the one or more text pages using a text editor software application;
   accessing a first file of the plurality of files in the file viewing environment of the split screen workspace GUIs through a keystroke performed on one or more keys on a keyboard, wherein the keyboard is adapted to operate as a data and command interface with the computer device and the content drafting software application, wherein the keystroke allows for toggling both within the content viewing environment and the file viewing environment individually, and between the content viewing environment and the file viewing environment collectively; and
   copying information stored in the first file of the plurality of files in the file viewing environment and pasting the copied information into any one of the one or more text pages in the content viewing environment,
   wherein the content viewing environment and the file viewing environment each are configured to support more than one file,
   wherein file viewing environment, content viewing environment, and spherically shaped workspace graphical user interface (GUI) are simultaneously displayed.

2. The method according to claim 1, wherein the step of accessing can be performed by one or more of voice commands or touch commands.

3. A server system adapted to generate creative content, the server system comprising:
   a memory storage device adapted to store instructions and one or more files;
   a processor coupled to the memory, the processor configured to execute a content creation software application, the content creation software application, when stored in the memory storage device and executed by the processor, is adapted to direct the server to:
   store, in the memory storage device in the server, a plurality of files;
   create, in the content creation software application, a split screen workspace graphical user interface (GUI), wherein the split screen workspace GUI includes a content viewing environment and a file viewing environment, wherein the content viewing environment and the file viewing environment are arranged horizontally side-by-side with respect to one another in the split screen workspace GUI;
   generate, by the content creation software application, an interactive spherically shaped workspace graphical user interface (GUI), into which each of the previously created plurality of split screen workspace GUIs occupy respective individual spaces about a horizontal center of the spherically shaped workspace GUI, and wherein the spherically shaped workspace GUI is adapted to be maneuvered and controlled by one or more of voice commands, keyboard commands, and touch commands, wherein the spherically shaped workspace graphical user interface (GUI) comprises a grid with cells and wherein the cells contain collections of files;
   add at least one of the plurality of files to the file viewing environment of the split screen workspace GUI;
   add one or more text pages to the content viewing environment of the split screen workspace GUI;
   enter text to a first of the one or more text pages using a text editor software application; access a first file of the plurality of files in the file viewing environment of the split screen workspace GUI through a keystroke performed on one or more keys on a keyboard, wherein the keyboard is adapted to operate as a data and command interface with the computer device and the content drafting application, wherein the keystroke allows for toggling both within the content viewing area and the file viewing environment individually, and between the content viewing environment and the file viewing environment collectively; and copy information stored in the first file of the one or more files in the file viewing environment and paste the copied information into any one of the one or more text pages in the content viewing environment, wherein the content viewing environment and the file viewing environment each are configured to support more than one file, wherein file viewing environment, content viewing environment, and spherically shaped workspace graphical user interface (GUI) are simultaneously displayed.

4. The system according to claim 3, wherein accessing the first file of the plurality of files in the file viewing environment of the split screen workspace GUI is performed by one or more of voice commands or touch commands.

5. The system according to claim 3, wherein the memory storage device is further adapted to store a plurality of files;

the content creation software application is further adapted to create a plurality of single or split screen workspace graphical user interfaces GUIs, wherein each of the plurality of single or split screen workspace GUIs includes a file viewing environment, and further wherein at least one file is added to the file viewing environment of each of the single or split screen workspace GUIs, and further wherein the content creation drafting application is further adapted to generate an interactive spherically shaped workspace graphical user interface (GUI), into which each of the previously created plurality of single or split screen workspace GUI occupy respective individual spaces about a horizontal center of the spherically shaped workspace GUI, and wherein the spherically shaped workspace GUI is adapted to be maneuvered and controlled by one or more of voice commands, keyboard commands, and touch commands.

6. The system according to claim 5, wherein each of the one or more of voice commands, keyboard commands, and touch commands can operate to rotate the spherical representation to the left, rotate the spherical representation to the right, open a selected single screen workspace to make available for review its contents, and close the selected single screen workspace and return it to its location on the spherical representation.

7. A server system adapted to generate creative content, the server system comprising:

a memory storage device adapted to store instructions and one or more files;

a processor coupled to the memory, the processor adapted to execute a content creation software application, the content creation software application, when stored in the memory storage device and executed by the processor, is adapted to direct the server to:

create, in the content creation software application, a split screen workspace graphical user interface (GUI), wherein the split screen workspace includes a content viewing environment and a file viewing environment, wherein the content viewing environment and the file viewing environment are arranged horizontally side-by-side with respect to another in the split screen workspace; add at least one file to the file viewing environment of the split screen workspace GUI, generate, by the content creation software application, an interactive spherically shaped workspace graphical user interface (GUI), into which each of the previously created plurality of split screen workspace GUIs occupy respective individual spaces about a horizontal center of the spherically shaped workspace GUI, and wherein the spherically shaped workspace GUI is adapted to be maneuvered and controlled by one or more of voice commands, keyboard commands, and touch commands, wherein the spherically shaped workspace graphical user interface (GUI) comprises a grid with cells and wherein the cells contain collections of files, wherein the content viewing environment and the file viewing environment each display content from different files, and wherein hovering over or clicking on a link in the content viewing area downloads and displays a webpage document in the file viewing area, wherein file viewing environment, content viewing environment, and spherically shaped workspace graphical user interface (GUI) are simultaneously displayed.

8. The system according to claim 7, wherein the content creation software application is further adapted to add a content viewing environment to the split screen workspace GUI to make it a split screen workspace GUI with both a content viewing environment and a file viewing environment.

9. The method according to claim 8, wherein the content creation software application is further adapted to add one or more text pages to the content viewing environment of the split screen workspace GUI.

10. The method according to claim 9, wherein the content creation software application is further adapted to enter text to a first of the one or more text pages of a first content viewing environment of a first split screen workspace GUI using a text editor application;

access a first file of the one or more files in the file viewing environment of the first split screen workspace GUI through a keystroke performed on one or more keys on a keyboard, wherein the keyboard is adapted to operate as a data and command interface with the computer device and the content creation software application; and copy information stored in the first file of the one or more files, and past the copied information into any one of the one or more text pages.

11. The system according to claim 5, wherein the spherically shaped workspace graphical user interface (GUI) comprises a grid with cells and wherein the cells contain collections of files.

12. The system according to claim 7, wherein the spherically shaped workspace graphical user interface (GUI) comprises a grid with cells and wherein the cells contain collections of files.

13. The method according to claim 1, wherein linking the first file in the content viewing environment with a file in the file viewing environment comprises multiple links, such that various locations with the file in the file viewing environment are linked to the content viewing environment.

14. The method according to claim 1, further comprising linking a second file in the content viewing environment with a second file in the file viewing environment, such that a voice command, keyboard commands, and touch or command allows immediate viewing access to the second file in the file viewing environment upon initiation of the command.

15. The method according to claim 1, further comprising linking a plurality of files in the content viewing environment with a plurality of files in the file viewing environment, such that a voice command, keyboard commands, and touch or command allows immediate viewing access to the plurality of files in the file viewing environment upon initiation of the command.

16. The method according to claim 1, wherein each of the one or more of voice commands, keyboard commands, and touch commands can operate to rotate the spherical representation to the left, rotate the spherical representation to the right, open a selected single screen workspace to make available for review its contents, and close the selected single screen workspace and return it to its location on the spherical representation.

17. The method according to claim 1, wherein the file viewing environment supports one or more files with different filename extensions.

18. The method according to claim 1, wherein content creation software application has an autosave function that ensures that the most recent view or state of the file viewing environment and the content viewing environment is saved.

* * * * *